(12) United States Patent
Nakamura

(10) Patent No.: US 11,106,409 B2
(45) Date of Patent: Aug. 31, 2021

(54) FEED INSTRUCTION APPARATUS, METHOD, AND STORAGE MEDIUM

(71) Applicant: CANON KABUSHIKI KAISHA, Tokyo (JP)

(72) Inventor: Sho Nakamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/515,986

(22) Filed: Jul. 18, 2019

(65) Prior Publication Data

US 2020/0050410 A1 Feb. 13, 2020

(30) Foreign Application Priority Data

Aug. 7, 2018 (JP) .............................. JP2018-148580

(51) Int. Cl.
    *G06F 3/12* (2006.01)
    *H04N 1/00* (2006.01)

(52) U.S. Cl.
    CPC .......... *G06F 3/1254* (2013.01); *G06F 3/1204* (2013.01); *G06F 3/1208* (2013.01); *G06F 3/1252* (2013.01); *G06F 3/1257* (2013.01); *H04N 1/00615* (2013.01)

(58) Field of Classification Search
    CPC .... G06F 3/1254; G06F 3/1257; G06F 3/1208; G06F 3/1252; G06F 3/1204
    See application file for complete search history.

(56) References Cited

U.S. PATENT DOCUMENTS

| 2006/0238811 | A1* | 10/2006 | Soma | G03G 15/55 |
| | | | | 358/1.16 |
| 2017/0334223 | A1* | 11/2017 | Noguchi | B41J 3/60 |
| 2017/0346973 | A1* | 11/2017 | Kusakabe | H04N 1/00408 |
| 2018/0127225 | A1* | 5/2018 | Kodama | B65H 3/063 |

FOREIGN PATENT DOCUMENTS

JP 2018-024517 A 2/2018

* cited by examiner

*Primary Examiner* — Benjamin O Dulaney
(74) *Attorney, Agent, or Firm* — Canon U.S.A., Inc. I.P. Division

(57) ABSTRACT

A feed instruction apparatus includes a reception unit and a transmission unit. The reception unit receives a print job for printing an image on a plurality of recording media. The transmission unit transmits, upon reception of the print job, a plurality of feed instructions for feeding two or more recording media of a number smaller than a total number of recording media subjected to printing based on the one received print job. Each time the feed instruction is received by a feeding unit, recording medium of a number based on the received feed instruction are fed one by one to a conveyance unit by the feeding unit. In processing the one print job, an image based on the one print job is printed on the recording media by a printing unit. The recording media is configured to be conveyed via the conveyance unit based on the plurality of feed instructions.

18 Claims, 14 Drawing Sheets

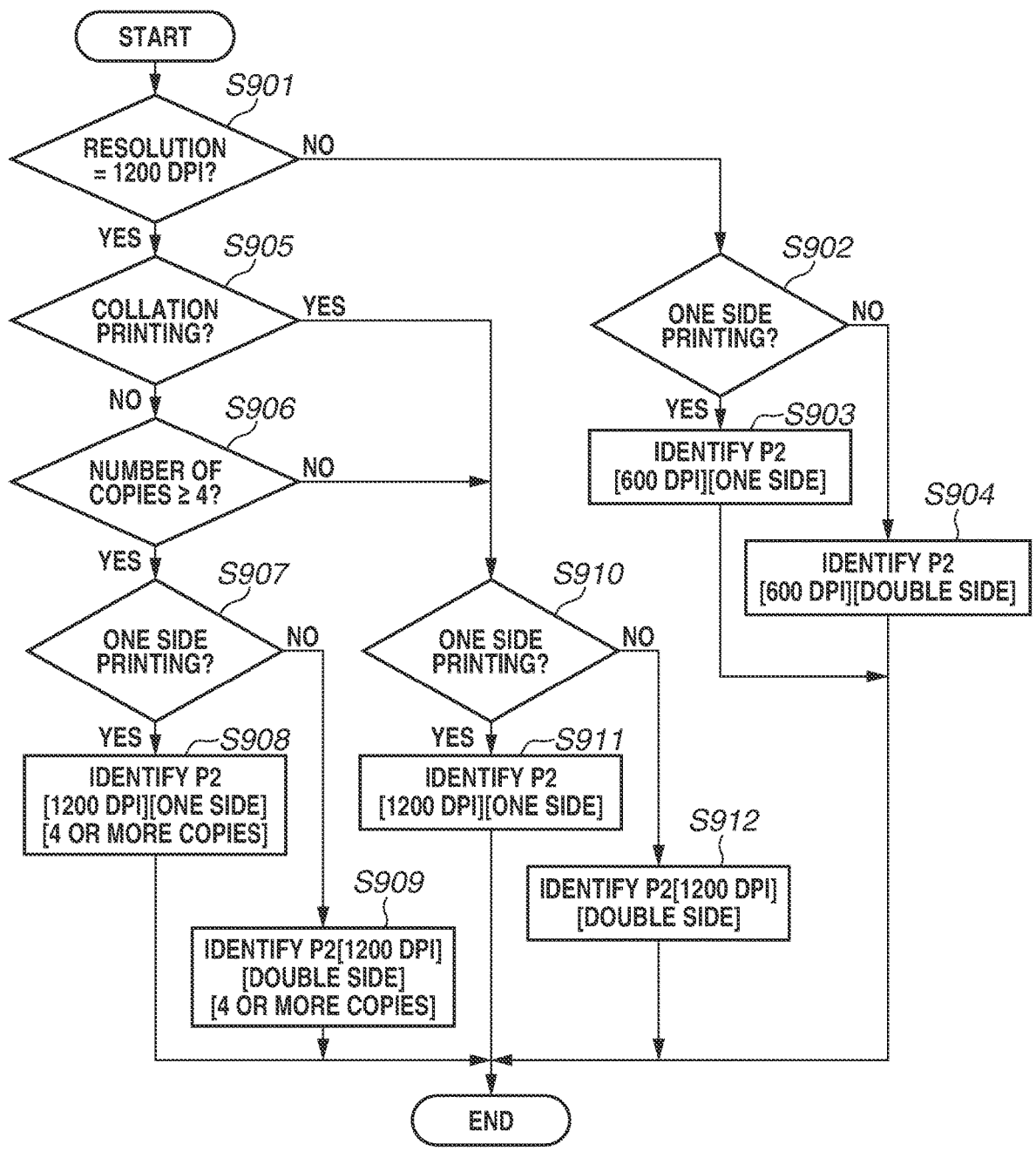

FIG.10A

| 600 DPI | | | REQUESTED NUMBER OF SHEETS TO BE FED AT START OF PRINTING | | | REQUESTED ADDITIONAL NUMBER OF SHEETS TO BE FED DURING PRINTING | | |
|---|---|---|---|---|---|---|---|---|
| ONE SIDE PRINTING | IMAGE DATA RECEPTION | | CONDITION | | REQUESTED NUMBER OF SHEETS TO BE FED (N1) | CONDITION | | REQUESTED NUMBER OF SHEETS TO BE FED (N2) |
| NO. OF COPIES | NO. OF PAGES | NO. OF SHEETS | NO. OF PIECES OF RECEIVED DATA (P1) | NO. OF PIECES OF DATA SUBJECTED TO IMAGE PROCESSING | | NO. OF PIECES OF RECEIVED DATA (P2) | NO. OF PIECES OF DATA SUBJECTED TO IMAGE PROCESSING (P2) | |
| 1 | 12 | 12 | 12 | — | 8 | 4 | 4 | 4 |
| 2 | 6 | 6 | 12 | — | 8 | 4 | 4 | 4 |
| 3 | 4 | 4 | 12 | — | 8 | 4 | 4 | 4 |
| 4 | 3 | 3 | 12 | — | 8 | 4 | 4 | 4 |
| 5 | 3 | 3 | 12 | — | 8 | 4 | 4 | 4 |
| 6 | 2 | 2 | 12 | — | 8 | 4 | 4 | 4 |
| 7 | 2 | 2 | 12 | — | 8 | 4 | 4 | 4 |
| 8 | 2 | 2 | 12 | — | 8 | 4 | 4 | 4 |
| 9 | 2 | 2 | 12 | — | 8 | 4 | 4 | 4 |
| 10 | 2 | 2 | 12 | — | 8 | 4 | 4 | 4 |
| ... | ... | ... | ... | ... | ... | ... | ... | ... |
| 50 | 1 | 1 | 12 | — | 8 | 4 | 4 | 4 |
| 51 | 1 | 1 | 12 | — | 8 | 4 | 4 | 4 |
| 52 | 1 | 1 | 12 | — | 8 | 4 | 4 | 4 |

FIG.10B

| DOUBLE SIDE PRINTING | IMAGE DATA RECEPTION | | CONDITION | | REQUESTED NUMBER OF SHEETS TO BE FED (N1) | CONDITION | | REQUESTED NUMBER OF SHEETS TO BE FED (N2) |
|---|---|---|---|---|---|---|---|---|
| NO. OF COPIES | NO. OF PAGES | NO. OF SHEETS | NO. OF PIECES OF RECEIVED DATA (P1) | NO. OF PIECES OF DATA SUBJECTED TO IMAGE PROCESSING | | NO. OF PIECES OF RECEIVED DATA (P2) | NO. OF PIECES OF DATA SUBJECTED TO IMAGE PROCESSING (P2) | |
| 1 | 24 | 24 | 24 | — | 8 | 8 | 8 | 4 |
| 2 | 12 | 12 | 24 | — | 8 | 8 | 8 | 4 |
| 3 | 8 | 8 | 24 | — | 8 | 8 | 8 | 4 |
| 4 | 6 | 6 | 24 | — | 8 | 8 | 8 | 4 |
| 5 | 6 | 6 | 24 | — | 8 | 8 | 8 | 4 |
| 6 | 4 | 4 | 24 | — | 8 | 8 | 8 | 4 |
| 7 | 4 | 4 | 24 | — | 8 | 8 | 8 | 4 |
| 8 | 4 | 4 | 24 | — | 8 | 8 | 8 | 4 |
| 9 | 4 | 4 | 24 | — | 8 | 8 | 8 | 4 |
| 10 | 4 | 4 | 24 | — | 8 | 8 | 8 | 4 |
| ... | ... | ... | ... | ... | ... | ... | ... | ... |
| 50 | 1 | 1 | 24 | — | 8 | 8 | 8 | 4 |
| 51 | 1 | 1 | 24 | — | 8 | 8 | 8 | 4 |
| 52 | 1 | 1 | 24 | — | 8 | 8 | 8 | 4 |

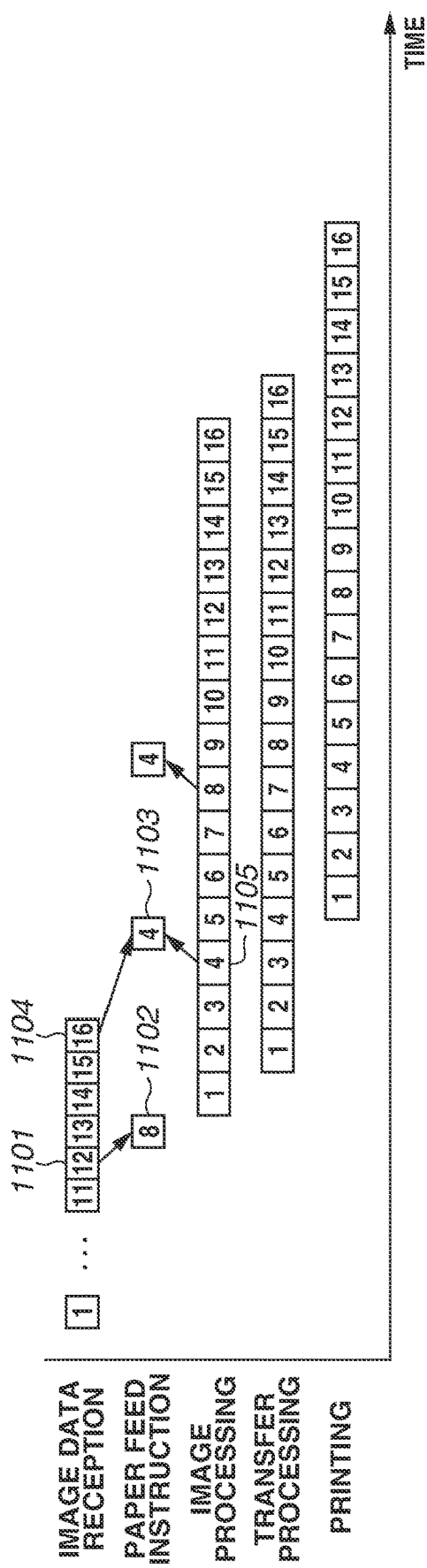

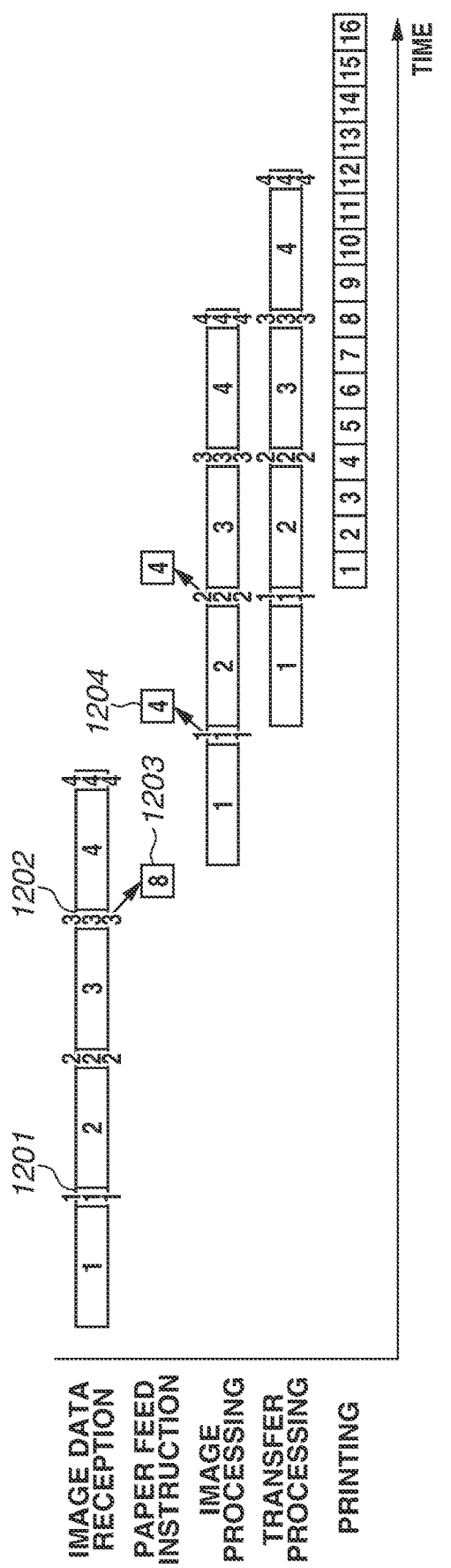

FEED INSTRUCTION APPARATUS, METHOD, AND STORAGE MEDIUM

BACKGROUND

Field

The present disclosure relates to a feed instruction apparatus, a method for controlling the feed instruction apparatus, and a storage medium.

Description of the Related Art

A known feeding apparatus successively feeds recording media to a conveyance unit for conveying recording media to a printing unit. The feeding apparatus achieves high-speed printing by successively feeding recording media to the conveyance unit without waiting for completion of printing on each recording medium.

Japanese Patent Application Laid-Open No. 2018-024517 discusses an apparatus for performing printing while successively feeding recording media to a conveyance path.

Upon reception of a recording medium feed instruction transmitted from a feed instruction apparatus, a feeding apparatus feeds recording media to a conveyance unit. With the increase in the use of feeding apparatuses for successively feeding recording media to a conveyance unit, it is demanded that a feed instruction apparatus suitably transmits a feed instruction to a feeding apparatus to achieve suitable feeding of recording media.

SUMMARY

The present disclosure is directed to suitably transmitting a feed instruction to a feeding apparatus. In an embodiment, there is provided a feed instruction apparatus including a transmission unit configured to, upon reception of a print job, transmit a plurality of feed instructions for feeding two or more recording media of a number smaller than a total number of recording media subjected to printing based on the one received print job.

According to an aspect of the present disclosure, a feed instruction apparatus includes a reception unit configured to receive a print job for printing an image on a plurality of recording media, and a transmission unit configured to transmit, upon reception of the print job, a plurality of feed instructions for feeding two or more recording media of a number smaller than a total number of recording media subjected to printing based on the one received print job, wherein, each time the feed instruction is received by a feeding unit, recording medium of a number based on the received feed instruction are fed one by one to a conveyance unit by the feeding unit, wherein, in processing the one print job, an image based on the one print job is printed on the recording media by a printing unit, and wherein the recording media is configured to be conveyed via the conveyance unit based on the plurality of feed instructions.

Further features of the present disclosure will become apparent from the following description of exemplary embodiments with reference to the attached drawings.

BRIEF DESCRIPTION OF THE DRAWINGS

FIG. 9 is another flowchart illustrating processing for determining a paper feed timing.
FIGS. 10A and 10B are examples of tables referred to in the processing for determining the number of sheets to be fed and the processing for determining a paper feed timing.
FIG. 11 illustrates a flow of processing performed based on a print job for performing one-side printing of 600 dots per inch (dpi) images for 16 pages in one copy.
FIG. 12 illustrates a flow of print processing based on a print job for performing one-side and collective printing of 1200-dpi images for 4 pages in 4 copies.

DESCRIPTION OF THE EMBODIMENTS

Exemplary embodiments of the present disclosure will be described below with reference to the accompanying drawings.

Image Forming Apparatus

Figure 1:
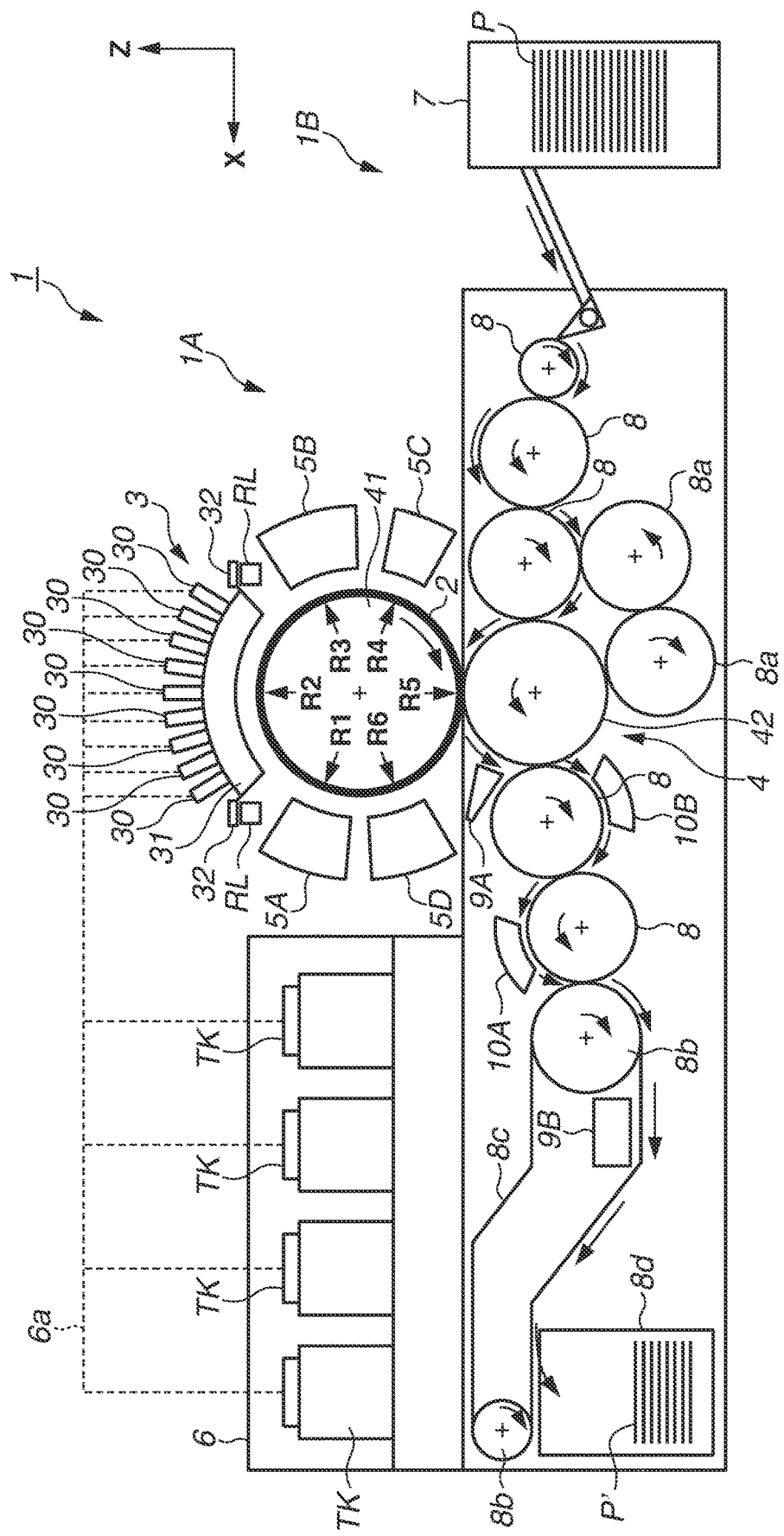
FIG. 1 illustrates an overview of a recording system.

FIG. 1 is an elevation view schematically illustrating an image forming apparatus 1 included in a recording system according to a first exemplary embodiment of the present disclosure. The image forming apparatus 1 according to the present exemplary embodiment includes a sheet-type ink-jet printer for producing a recorded matter P' by transferring an ink image onto a recording medium P via a transfer member 2. The image forming apparatus 1 includes an image forming unit 1A and a conveyance unit 1B. According to the present exemplary embodiment, the X-, the Y-, and the Z-axis directions indicate the width (total length), the depth, and the height directions of the image forming apparatus 1, respectively. The recording medium P is conveyed in the X direction.

According to the present specification, "recording" includes not only forming texts, drawings, and other meaningful information but also forming images, designs, patterns, and other meaningful and meaningless information on a recording medium, and also includes processing a recording medium. Therefore, with respect to "recording", it does not matter whether the outcome is elicitable to be perceived by the human visual sense. According to the present exemplary embodiment, sheet-like paper is assumed as "a recording medium". Therefore, in the following descriptions, feeding a recording medium is also referred to as "paper feeding". Recording media may include not only paper but also cloths and plastic films.

Although ink components are not limited, the present exemplary embodiment assumes a case where water pigment ink containing pigment as a color material, water, and resin is used.

Although, in the present exemplary embodiment, the image forming apparatus 1 is a printer for performing printing with an ink-jet process, the present disclosure is not limited thereto. The image forming apparatus 1 may be, for example, an electrophotographic type printer, a heat sublimation type printer, and printers of other types.

The present exemplary embodiment is characterized by a paper feed instruction transmitted to a paper feeding unit (paper feeding apparatus) for feeding paper. Therefore, the present exemplary embodiment needs to be applied at least to an apparatus (a feed instruction apparatus) for transmitting a paper feed instruction (feed instruction) in the image forming apparatus 1. According to the present exemplary embodiment, a paper feed instruction apparatus, the image forming apparatus 1, and the paper feeding apparatus are included in one housing. However, the paper feed instruction apparatus and the image forming apparatus 1 may be separate apparatuses, or the paper feed instruction apparatus and the paper feeding apparatus may be separate apparatuses.

Image Forming Unit

The image forming unit 1A includes a recording unit 3, a transfer unit 4, peripheral units 5A to 5D, and a supply unit 6.

Recording Unit

Figure 2:
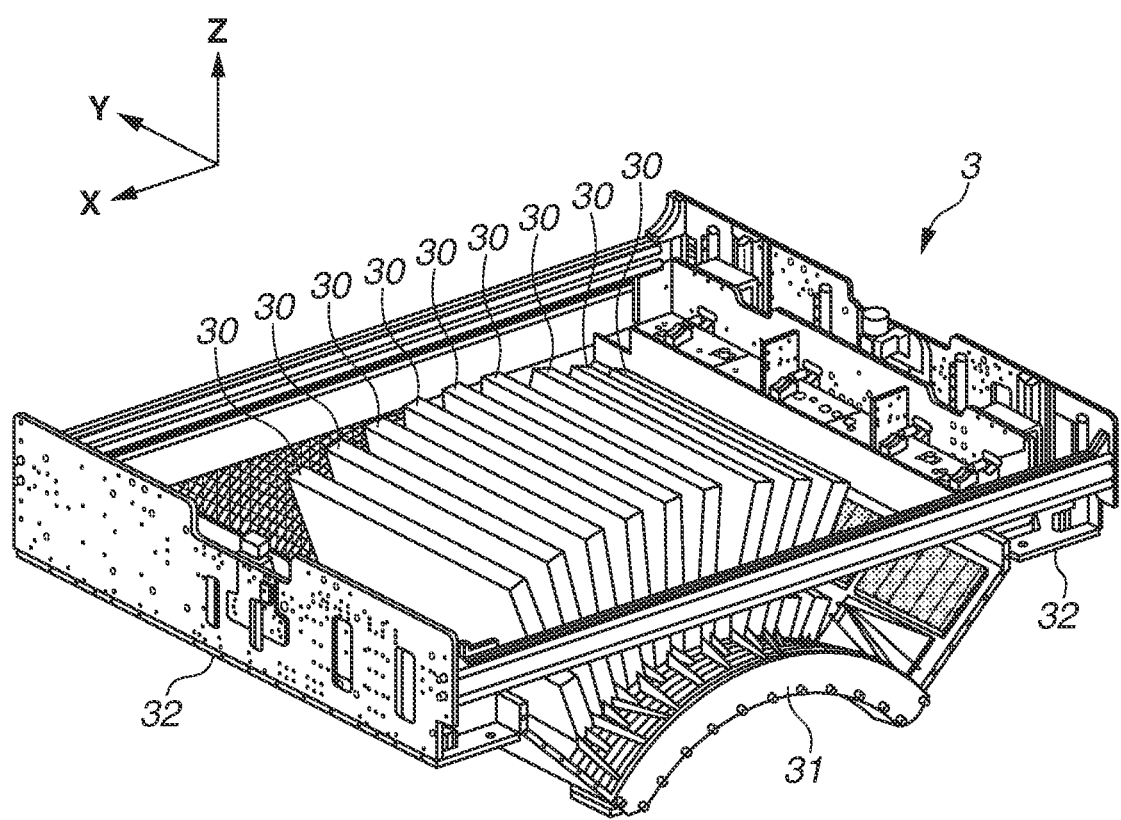
FIG. 2 is a perspective view illustrating a recording unit.

As illustrated in FIGS. 1 and 2, the recording unit (printing unit) 3 includes a plurality of recording heads 30 and a carriage 31. FIG. 2 is a perspective view illustrating the recording unit 3. Each recording head 30 discharges liquid ink onto the transfer member 2 to form an ink image as a recorded image on the transfer member 2.

According to the present exemplary embodiment, each recording head 30 is a full line head extended in the Y direction. Discharge ports are arranged in the range covering the width of the image recording area of the recording medium with the maximum applicable size. The recording head 30 is provided with a discharge surface in its undersurface, where a discharge port is formed. The discharge surface faces the surface of the transfer member 2 with a minute gap (for example, several millimeters). According to the present exemplary embodiment, the transfer member 2 is configured to circularly move on a circular orbit. For this reason, the plurality of recording heads 30 is radially arranged from the center of the transfer member 2.

Each discharge port includes a discharge energy generation element (hereinafter also referred to as a discharge element) for discharging ink. Each discharge element, for example, generates pressure in a discharge port to discharge ink in the discharge port. Examples of discharge elements include an element for discharging ink by generating film boiling through an electrothermal converter to form air bubbles, an element for discharging ink through an electromechanical (piezoelectric) converter, and an element (heater) for discharging ink by using static electricity. From the viewpoint of high-speed high-density recording, the use of a discharge element using an electrothermal converter is effective.

According to the present exemplary embodiment, nine recording heads 30 are disposed. The recording heads 30 discharge respectively different types of ink. Examples of different types of ink include different color materials, more specifically, yellow ink, magenta ink, cyan ink, and black ink. Although one recording head 30 discharges one type of ink, one recording head 30 may be configured to discharge a plurality of types of ink. If the plurality of recording heads 30 is provided in this way, some of the recording heads 30 may discharge ink not containing a color material (for example, image quality improvement liquid).

The carriage 31 supports the plurality of recording heads 30. The end on the discharge surface side of each recording head 30 is fixed to the carriage 31. This makes it possible to more precisely maintain the gap between the discharge surfaces and the surface of the transfer member 2. The carriage 31 is configured to be displaced while mounting the recording heads 30 by the guidance of guiding members RL. According to the present exemplary embodiment, the guiding members RL are rail members extended in the Y direction. Each of a pair of guiding members RL is separately disposed in the X direction. A sliding portion 32 is disposed on each side of the carriage 31 in the X direction. The sliding portions 32 are engaged with the guiding members RL and slide in the Y direction along the guiding members RL.

Conveyance Unit

The conveyance unit 1B feeds the recording media P stacked on a stacking unit to the transfer unit 4. The recording medium P fed to the transfer unit 4 is subjected to transfer of an ink image (i.e., printing). Then, the conveyance unit 1B discharges the recorded matter P' with the ink image transferred thereon from the transfer unit 4. The conveyance unit 1B includes a feeding unit 7, a plurality of conveyance cylinders 8 and 8a, two sprockets 8b, a chain 8c, and a collection unit 8d. Referring to FIG. 1, circular arc arrows drawn in the conveyance cylinders 8 and 8a (described below) in the conveyance unit 1B indicate the rotational directions of the conveyance cylinders 8 and 8a, and arrows outside the conveyance cylinders 8 and 8a indicate the conveyance path of the recording medium P or the recorded matter P'. The recording medium P is conveyed from the feeding unit 7 to the transfer unit 4, and the recorded matter P' is conveyed from the transfer unit 4 to the collection unit 8d. The side of the feeding unit 7 may be referred to as the upstream side, and the side of the collection unit 8d may be referred to as the downstream side in the conveyance direction.

The feeding unit 7 includes the stacking unit for stacking the plurality of recording media P, and a feeding mechanism for feeding the recording media P one by one from the stacking unit to the conveyance cylinder 8 on the most upstream side. Each of the conveyance cylinders 8 and 8a is a rotating body rotating around the rotational axis in the Y direction and has a cylinder-like outer circumferential surface. The outer circumferential surface side of each of the conveyance cylinders 8 and 8a is provided with at least one gripping mechanism for holding the leading edge of the recording medium P (or the recorded matter P'). The gripping and releasing operations of each gripping mechanism are controlled so that the recording medium P is transferred between adjacent conveyance cylinders.

The two conveyance cylinders 8a are provided to invert the recording medium P. When performing double-sided recording on the recording medium P, after image transfer onto the front surface of the recording medium P, the recording medium P is transferred from a cylinder 42 not to the adjacent conveyance cylinder 8 on the downstream side but to the conveyance cylinders 8a. When the recording medium P travels along the two conveyance cylinders 8a, the front and back surfaces are reversed. Then, the recording medium P travels along the conveyance cylinders 8 on the upstream side of the cylinder 42 and is passed to the cylinder 42 again. Thus, the back surface of the recording medium P faces a transfer cylinder 41 to be subjected to ink image transfer.

The chain 8c is stretched between the two sprockets 8b. One of the two sprockets 8b is a drive sprocket, and the other of the two sprockets 8b is a driven sprocket. The chain 8c circularly travels by the rotation of the drive sprocket. The chain 8c is provided with a plurality of gripping mechanisms in separation in the longitudinal direction. The gripping mechanisms grip an edge of the recorded matter P'. The recorded matter P' is passed from the conveyance cylinder 8 located at the downstream end to the gripping mechanism of the chain 8c. When the recorded matter P' gripped by the gripping mechanism is conveyed to the collection unit 8d by the traveling of the chain 8c, the gripping is released. Thus, the recorded matter P' is stacked in the collection unit 8d.

Control Unit

Figure 3:
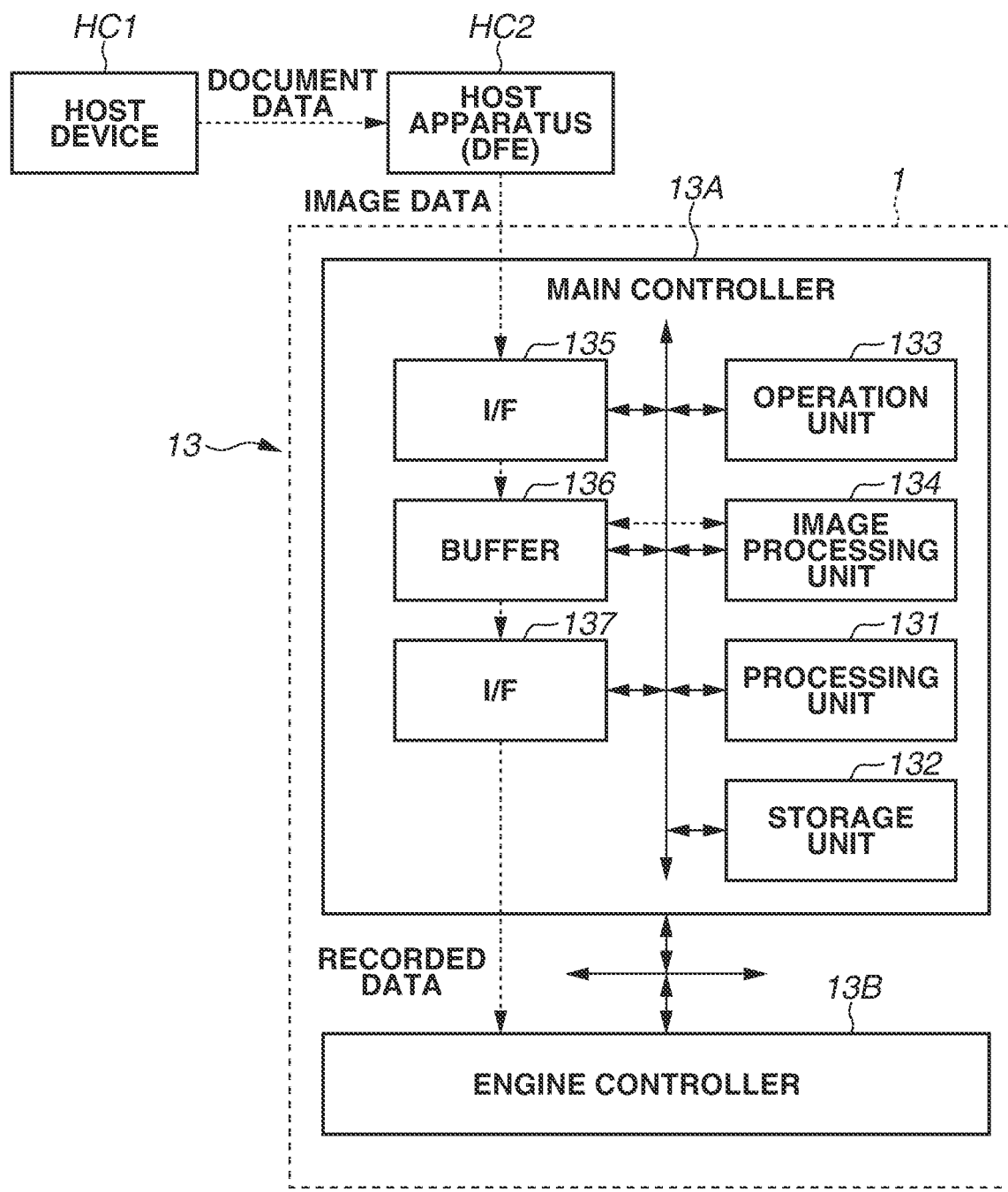
FIG. 3 is a block diagram illustrating a hardware configuration of a control unit of an image forming apparatus.
Figure 4:
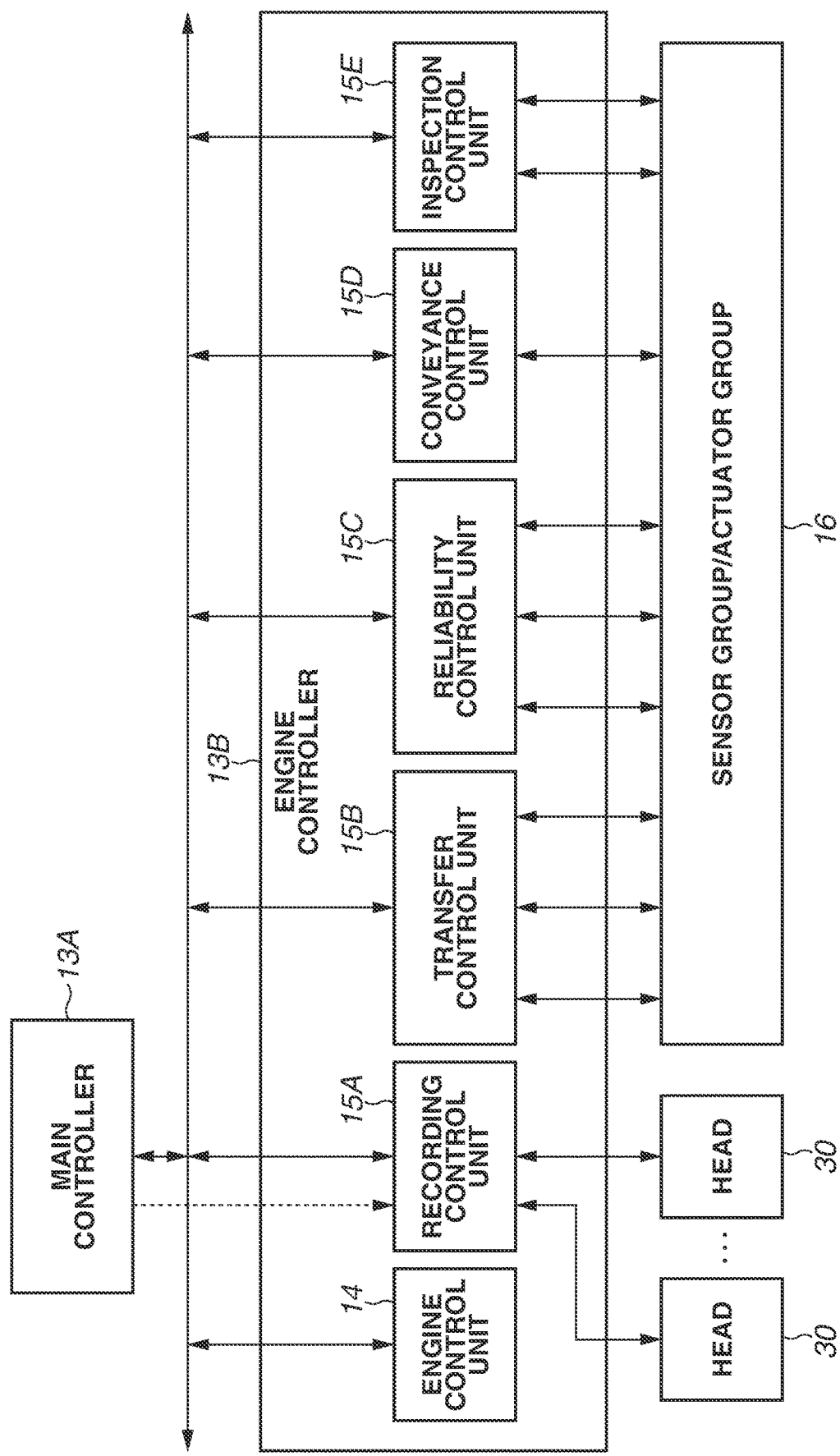
FIG. 4 is another block diagram illustrating the hardware configuration of the control unit of the image forming apparatus.

A control unit 13 of the image forming apparatus 1 will be described below. FIGS. 3 and 4 are block diagrams illustrating hardware configurations of the control unit 13 of the image forming apparatus 1. The control unit 13 is communicably connected with a host device (digital front end processor (DFE)) HC2. The host device HC2 is communicably connected with a host device HC1.

In the host device HC1, document data as a source of a recorded image is generated or stored. In the host device HC1, document data is generated, for example, in a format for an electronic file such as a document file or a graphics file, e.g., portable document format (pdf) data format. The document data is transmitted to the host device HC2. The host device HC2 converts received document data into data in a data format usable by the control unit 13 (for example, the red, green, and blue (RGB) data format for representing an image based on RGB). The data after the conversion is transmitted as image data from the host device HC2 to the control unit 13. The control unit 13 starts recording operations based on the received image data. The host device HC1 is an apparatus that executes generating or storing document data, such as a personal computer (PC), a smart phone, a tablet terminal, or any other information processing apparatuses.

According to the present exemplary embodiment, the control unit 13 is roughly classified into a main controller 13A and an engine controller 13B. The main controller 13A including a processing unit 131, a storage unit 132, an operation unit 133, an image processing unit 134, a communication interface (I/F) 135, a buffer 136, and a communication I/F 137 functions as a feed instruction apparatus according to the present exemplary embodiment. The engine controller 13B functions as a feeding apparatus according to the present exemplary embodiment.

The processing units 131 is a processor such as a central processing unit (CPU). The processing unit 131 executes a program stored in the storage unit 132 to control the entire main controller 13A. The storage unit 132 is a storage device such as a random access memory (RAM), read only memory (ROM), hard disk, or solid state drive (SSD). Programs to be executed by the CPU and data are stored in the storage unit 132. The storage unit 132 provides a work area used by the CPU to perform processing. The processing unit 131 and the storage unit 132 form a computer of the image forming apparatus 1. The operation unit 133 is input devices, such as a touch panel, keyboard, and mouse, for receiving a user's instruction.

The image processing unit 134 is, for example, an electronic circuit including an image processor. The buffer 136 is composed of, for example, a RAM, hard disk, or SSD. The communication I/F 135 performs communication with the host device HC2 and communication with the engine controller 13B.

Dashed line arrows illustrated in FIG. 3 indicate flows of image data processing. Image data received from the host device HC2 via the communication I/F 135 is accumulated in the buffer 136. The image processing unit 134 reads image data from the buffer 136 and performs predetermined image processing on the read image data. The image processing unit 134 stores the processed image data in the buffer 136 again. The image data having undergone the image processing stored in the buffer 136 is transmitted as print data to be used by a print engine, to the engine controller 13B via the communication I/F 137.

As illustrated in FIG. 4, the engine controller 13B includes an engine control unit 14, a recording control unit 15A, a transfer control unit 15B, a reliability control unit 15C, a conveyance control unit 15D, and an inspection control unit 15E. Using these control units, the engine controller 13B acquires detection results of a sensor group and an actuator group 16 included in the image forming apparatus 1 and performs drive control on each unit. Each control unit included in the engine controller 13B is provided with a processor such as a CPU, storage devices such as a RAM and a ROM, and an interface with an external device. The control units as divisions of the engine controller 13B are to be considered as examples. The engine controller 13B may include a plurality of control units as subdivisions of part of control. On the contrary, the plurality of control units may be integrated to one control unit so that the control contents of these units are performed by the one control unit.

According to the present exemplary embodiment, the control units included in the engine controller 13B implement the following functions. More specifically, the engine control unit 14 controls the entire engine controller 13B. The recording control unit 15A converts print data received from the main controller 13A into raster data, for example, data in a data format suitable for driving the recording heads 30. The recording control unit 15A performs discharge control for driving the recording elements of the recording heads 30 to discharge ink from the discharge ports. The transfer control unit 15B controls an application unit 5A, an absorption unit 5B, a heating unit 5C, and a cleaning unit 5D. The reliability control unit 15C controls the supply unit 6, a recovery unit 12, and a drive mechanism for moving the recording unit 3 between a discharge position and a recovery position. The conveyance control unit 15D controls the conveyance unit 1B. The inspection control unit 15E controls an inspection units 9A and 9B. The sensor group and the actuator group 16 will be described below. The sensor group includes a sensor for detecting the position and speed of a movable portion, a sensor for detecting temperature, and an image sensor. The actuator group 16 includes a motor, an electromagnetic solenoid, and an electromagnetic valve.

Figure 5:
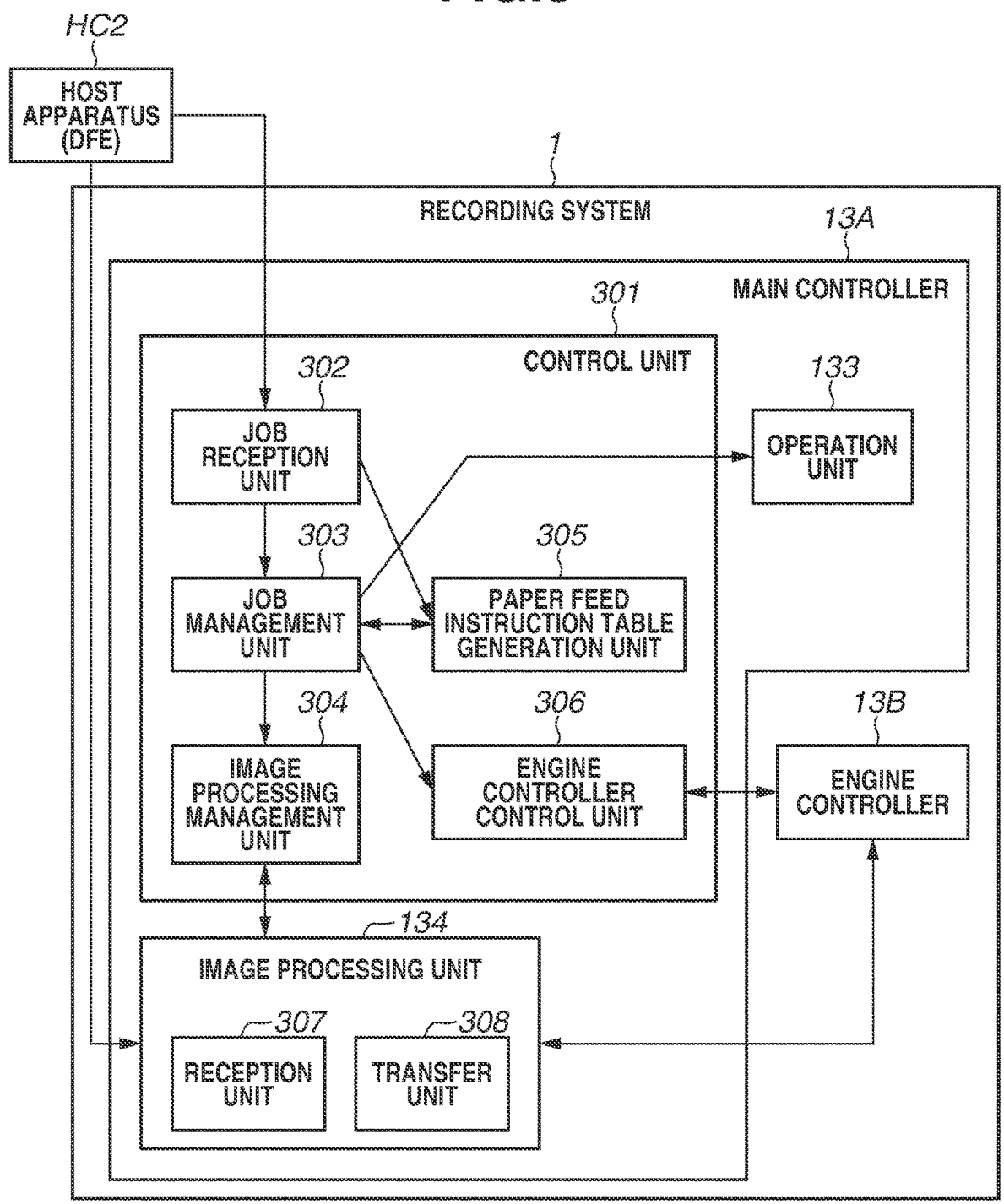
FIG. 5 is a block diagram illustrating a functional configuration of a main controller.

FIG. 5 is a block diagram illustrating a functional configuration of the main controller 13A in the control unit 13 illustrated in FIG. 3.

As described above, the control unit 13 includes the main controller 13A and the engine controller 13B. The main controller 13A includes a control unit 301, the image processing unit 134, and the operation unit 133.

The control unit 301 analyzes print job information and page information based on a print job as reception data from the host device HC2 and performs predetermined data processing. Based on the result of the above-described analysis and an instruction from the operation unit 133, the control unit 301 transmits commands generated by a paper feed control unit 306 and a print information transfer unit 308 (described below) to the engine controller 13B. The paper feed control unit 306 instructs the engine controller 13B about the number of sheets to be fed and receives a paper feed notification for each sheet from the engine controller 13B. The print information transfer unit 308 transfers print information based on such page information as the order of pages subjected to printing.

On the other hand, the operation unit 133 receives operation instructions and displays apparatus statuses. The engine controller (feeding unit) 13B controls the feeding operation of the feeding unit 7 as an engine according to a paper feed instruction transmitted from the control unit 301. The engine controller 13B also controls the recording heads 30 based on print data transmitted from the control unit 301 to perform image forming on the conveyed paper.

The control unit 301 includes a job reception unit (reception unit) 302, a job management unit 303, an image processing management unit 304, a paper feed instruction table generation unit (generation unit) 305, the paper feed control unit 306, and a print information transfer unit 308 as functional units for performing the above-described processing.

The job reception unit 302 receives print job data and page information data from the host device HC2, analyzes these pieces of data, and stores the data. According to the present exemplary embodiment, a plurality of images is printed on a recording medium based on the same print setting based on one print job.

The job management unit 303 determines the print information setting and the order of print data transmission by using the data stored by the job reception unit 302. Based on the determined result, the job management unit 303 also instructs the print information transfer unit 308 to control the engine controller 13B.

The image processing management unit 304 manages image processing specified by the job management unit 303. The paper feed instruction table generation unit 305 receives page information at the time of page reception by the job reception unit 302, generates a paper feed instruction table, and updates the table.

When the paper feed control unit (engine controller control unit) 306 is instructed to transmit a paper feed instruction by the job management unit 303, the paper feed control unit 306 transmits a paper feed instruction to the engine controller 13B. Each time the engine controller 13B feeds one sheet, the paper feed control unit 306 receives a notification indicting that one sheet has been fed, from the engine controller 13B, and notifies the job management unit 303 of the feeding status.

The print information transfer unit 308 transmits print setting information specified by the job management unit 303 to the engine controller 13B.

The image processing unit 134 receives bit map data for printing from the host device HC2 and writes the data in a reception unit 307. Then, the image processing unit 134 inputs the bit map data, performs the image processing on the data, and writes the processed print data in the transfer unit 308. The transfer unit 308 transmits the print data having undergone the image processing to the engine controller 13B.

An issue to be addressed by the present exemplary embodiment will be described below. According to the present exemplary embodiment, when the paper feed control unit 306 transmits a paper feed instruction to the engine controller 13B, the engine controller 13B feeds paper. Upon reception of the paper feed instruction, the engine controller 13B successively feed paper to the conveyance unit 1B without waiting for completion of printing on each fed sheet. To perform printing based on a print job without interruption, it is necessary that the next paper feed instruction reaches the engine controller 13B before completion of paper feeding by the last paper feed instruction transmitted to the engine controller 13B. After transmitting a print job to the image forming apparatus 1, if the user wants to interrupt printing based on the print job, the user can perform a cancel operation. More specifically, the user can perform the cancel operation on operation units of the host device HC1 and the host device HC2. Upon reception of the cancel operation, the host device HC1 and the host device HC2 transmit a cancel instruction to the control unit 301. Upon reception of the cancel instruction, the control unit 301 stops transmitting a paper feed instruction and print data to the engine controller 13B.

When performing printing on a plurality of sheets, for example, the control unit 301 is assumed to successively transmit a paper feed instruction for one sheet to instruct the engine controller 13B to successively feed paper. In this case, if the paper feed instruction belatedly reaches the engine controller 13B, the engine controller 13B may stop paper feeding and perform maintenance processing. More specifically, even after a first paper feed instruction and a second paper feed instruction are transmitted in this order to the engine controller 13B, if the second paper feed instruction does not reach the engine controller 13B before completion of paper feeding by the first paper feed instruction, the maintenance processing is performed before paper feeding by the second paper feed instruction. More specifically, upon completion of paper feeding by the first paper feed instruction in a state where the engine controller 13B has not received the second paper feed instruction, the engine controller 13B stops paper feeding and performs the maintenance processing. For example, if the paper feed instruction reached the engine controller 13B without delay but is not immediately reflected, the engine controller 13B may stop paper feeding. The above-described situation is likely to occur particularly in a form in which the control unit 301 and the engine controller 13B are connected via an interface as in the present exemplary embodiment. This is unlike a form in which the engine controller 13B and the control unit 301 are connected with an internal bus.

According to the present exemplary embodiment, as described above, the maintenance processing including cleaning processing and capping processing for the printing heads 30 is started when paper feeding stops. Also, before resuming printing, processing for releasing the capping of the printing heads 30 and processing for accelerating the rotation of the conveyance cylinders 8 are performed. More specifically, to complete the remaining print processing once interrupted, it is necessary to wait for completion of these pieces of processing.

In a form in which paper is fed by the engine controller 13B by successively issuing a paper feed instruction for one sheet in this way, there arises an issue that completion of printing may be delayed in the above-described situation.

On the other hand, for example, when performing printing on a plurality of sheets, paper may be fed by the engine controller 13B by collectively issuing a paper feed instruction for the total number of sheets. However, in some cases, paper feeding based on a paper feed instruction that reached the engine controller 13B cannot be stopped even if the user performs a cancel operation during paper feeding. Therefore, in a form in which paper is fed by the engine controller 13B by collectively issuing a paper feed instruction for the total number of sheets, there arises an issue that useless paper feeding is performed if the user performs a cancel operation.

Therefore, the present exemplary embodiment will be described below centering on a form in which a paper feed instruction is suitably transmitted.

FIG. 11 illustrates a flow of processing performed based on a print job for performing one-side printing of 600-dots per inch (dpi) images for 16 pages in one copy according to the present exemplary embodiment.

During the time period since the time when a print job is received by the processing unit 131 till the time when printing based on the print job is started, four steps of processing (image data reception processing, paper feed instruction processing, image processing, and transfer processing) are performed.

Referring to FIG. 11, the width of each square indicates the processing time. More specifically, the width of a square in the image data reception processing indicates the time period required for the image processing unit 134 to complete the reception of image data for one page from the host device HC2. The width of a square in the paper feed instruction processing indicates the time period required for the engine controller control unit 306 to perform once the paper feed instruction processing on the engine controller 13B. When the paper feed instruction processing is performed, a paper feed instruction is transmitted to the engine controller 13B. The width of a square in the image processing and the transfer processing indicates the processing time for image data for one page. According to the present exemplary embodiment, processing for converting the data format of image data from the RGB data format into the cyan, magenta, yellow, and black (CMYK) data format is performed as image processing.

The number in a square in the image data reception processing indicates the page number of the image data that is being received. More specifically, for example, an image data reception 1101 indicates that image data for the 12th page is currently being received. The number in a square in a paper feed instruction indicates the number of sheets subjected to the paper feed instruction. More specifically, for example, a paper feed instruction 1102 indicates an instruction for feeding 8 sheets. The arrow from the image data reception 1101 to the paper feed instruction 1102 means that a paper feed instruction is to be issued upon reception of image data for 12 pages. An additional paper feed instruction 1103 indicates an instruction for feeding 4 sheets. The arrows from an image data reception 1104 and image processing 1105 to the additional paper feed instruction 1103 mean that a paper feed instruction is to be issued upon reception of image data for 4 pages and upon completion of the image processing for 4 pages since the last paper feed instruction was transmitted. The number in a square in the image processing indicates the page number of the image data currently being converted into print data through the image processing. The number in a square in the transfer processing indicates the page number of the print data currently being transferred.

After a print job is received by the processing unit 131, the image data corresponding to the print job is sequentially received from the first page by the image processing unit 134. In this case, the number of sheets subjected to printing by the print job received is assumed to be 16. Then, upon reception of image data for a predetermined number of sheets (12 sheets), the control unit 301 transmits a paper feed instruction (first paper feed instruction) to the engine controller 13B to instruct it to feed 8 sheets. Upon transmission of the paper feed instruction, the image processing unit 134 starts the image processing on the received image data. The image data is converted into print data by the image processing. Then, each time the conversion into print data is completed, the print data is transferred to the engine controller 13B.

If the engine controller 13B has received the paper feed instruction, and the reception of print data for the number of sheets to be fed based on the paper feed instruction is completed, the engine controller 13B starts paper feeding. Thus, sheets of the number based on the paper feed instruction are fed one by one to the conveyance unit 1B.

Then, image data for the predetermined number of sheets (4 sheets) is received, and the image processing on image data for 4 sheets is completed since the last paper feed instruction was transmitted. At this timing, the control unit 301 transmits a paper feed instruction (second paper feed instruction) to the engine controller 13B to instruct it to feed 4 sheets.

Subsequently, the reception of all of the image data corresponding to the print job is completed, and the image processing on image data for 4 sheets is completed since the last paper feed instruction was transmitted. At this timing, the control unit 301 transmits a paper feed instruction (third paper feed instruction) to the engine controller 13B to instruct it to feed 4 sheets. The control unit 301 repeats this processing until a paper feed instruction for the number of sheets subjected to printing by the print job is completed. Thus, all of sheets subjected to printing by the print job are fed to the conveyance unit 1B.

Each paper feed instruction transmitted according to the present exemplary embodiment is not a paper feed instruction for feeding at one time all of sheets subjected to printing by a received print job but a paper feed instruction for feeding a plurality of sheets. Such a paper feed instruction is transmitted a plurality of times. Transmitting paper feed instructions in this way allows addressing the above-described issue and suitably performing paper feeding. More specifically, it is possible to prevent printing from being interrupted and restrict the number of sheets to be wasted when printing is canceled.

Figure 6:
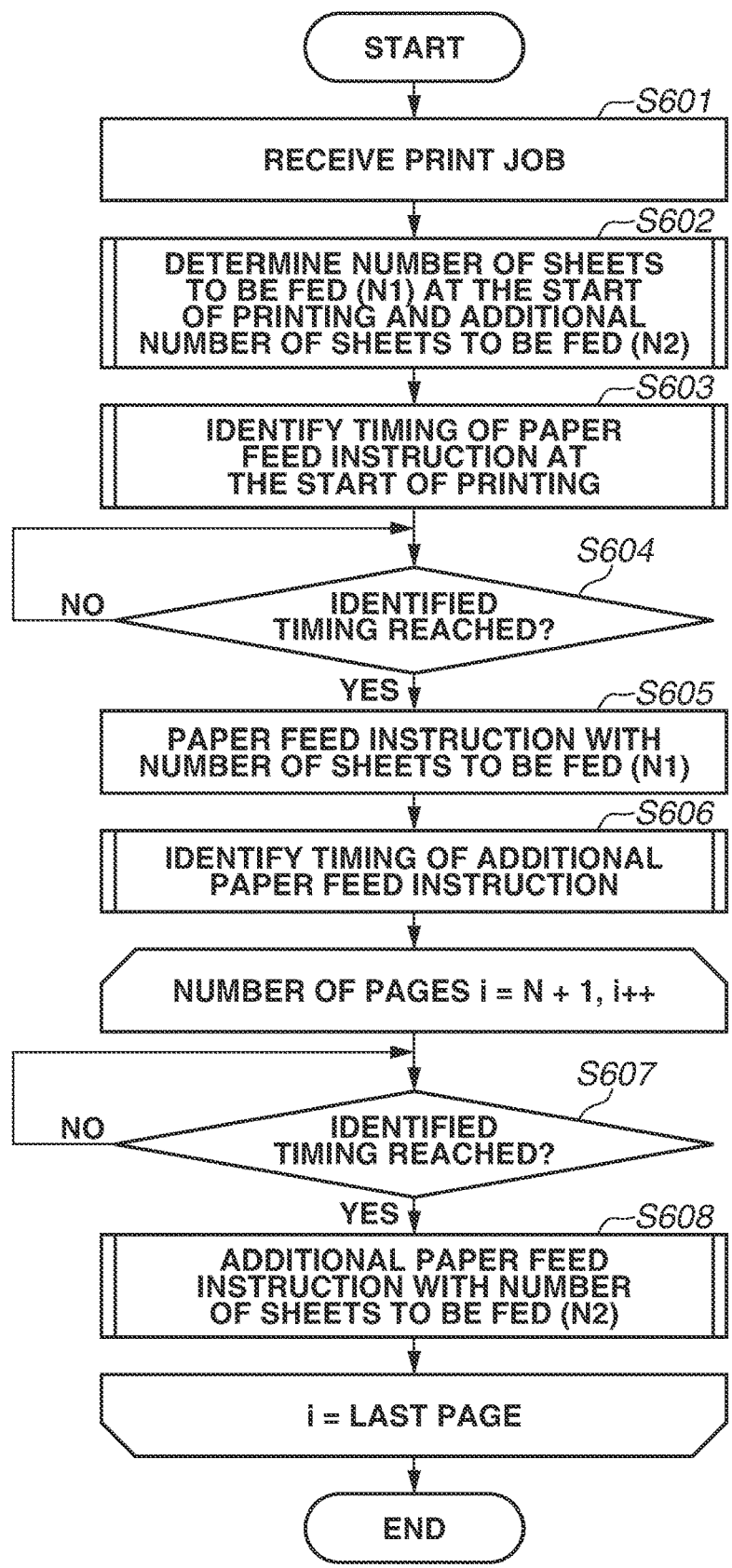
FIG. 6 is a flowchart illustrating processing for transmitting a paper feed instruction.

FIG. 6 is a flowchart illustrating a flow of processing for transmitting paper feed instructions. The processing illustrated in this flowchart is implemented when the processing unit 131 reads and executes a program stored in the ROM of the storage unit 132.

In step S601, the processing unit 131 receives a print job from the host device HC2. Although the print setting information is included in the print job to be received, the image data to be printed by the print job is not included therein. The image data will be separately received in processing in subsequent stages.

In step S602, the processing unit 131 analyzes the print setting information included in the received print job, and identifies information including the paper size, printing surface (one side/double side), and print resolution (600 dpi/1200 dpi). Then, based on the identified information, the processing unit 131 determines the number of sheets of recording media to be fed, N1, at the start of printing and the additional number of sheets to be fed, N2. This processing will be described in detail below with reference to FIG. 7.

In step S603, the processing unit 131 analyzes the print setting included in the received print job and identifies the timing for instructing to feed N1 sheets. This processing will be described in detail below with reference to FIG. 8.

In step S604, the processing unit 131 determines whether the timing identified in step S603 is reached. More specifically, the processing unit 131 determined whether image data for P1 sheets identified in step S603 has been received. When the processing unit 131 determines that the image data has been received (YES in step S604), the processing proceeds to step S605. On the other hand, when the processing unit 131 determines that the image data has not been received (NO in step S604), the processing returns to step S604. When the number of pieces of the image data based on the received print job is P1 or less, the processing unit 131 determines that the image data has been received (YES in step S604) at the timing when all of the image data based on the received print job has been received. Each time the reception of a predetermined number of pieces of image data is completed, the processing unit 131 transmits the image data to the image processing unit 134 to instruct it to start the image processing.

In step S605, the processing unit 131 transmits a paper feed instruction (first paper feed instruction) at the start of printing to the engine controller 13B. More specifically, the processing unit 131 transmits a paper feed instruction to the engine controller 13B to instruct it to feed N1 sheets of recording media to the transfer unit 4. At this timing, only a paper feed instruction is transmitted but the engine controller 13B has not yet started paper feeding. The engine controller 13B starts paper feeding upon reception of a paper feed instruction and pieces of print data of the number corresponding to the paper feed instruction.

In step S606, the processing unit 131 identifies the interval between instructions for instructing to feed N2 sheets and identifies the timing for instructing to feed N2 sheets. This processing will be described in detail below with reference to FIG. 8.

In step S607, the processing unit 131 determines whether the timing identified in step S606 is reached. More specifically, the processing unit 131 determines whether image data for P2 sheets identified in step S606 is received after transmitting a paper feed instruction last and the image processing on the image data for P2 sheets identified in step S606 is completed after transmitting a paper feed instruction last. After receiving all of image data based on the print job, the processing unit 131 determines whether the image processing on the image data for P2 sheets identified in step S606 is completed after transmitting a paper feed instruction last. When the processing unit 131 determines that the timing is reached (YES in step S607), the processing proceeds to step S608. On the other hand, when the processing unit 131 determines that the timing is not reached (NO in step S607), the processing returns to step S607.

In step S608, the processing unit 131 transmits additional paper feed instructions (second and subsequent paper feed instructions) to the engine controller 13B. More specifically, the processing unit 131 transmits a paper feed instruction to the engine controller 13B to instruct it to feed N2 sheets of recording media to the transfer unit 4.

Subsequently, the processing unit 131 repetitively performs steps S607 and S608 till the issuance of an instruction for feeding the sheet subjected to printing of the last page out of pages subjected to printing based on the print job.

Figure 7:
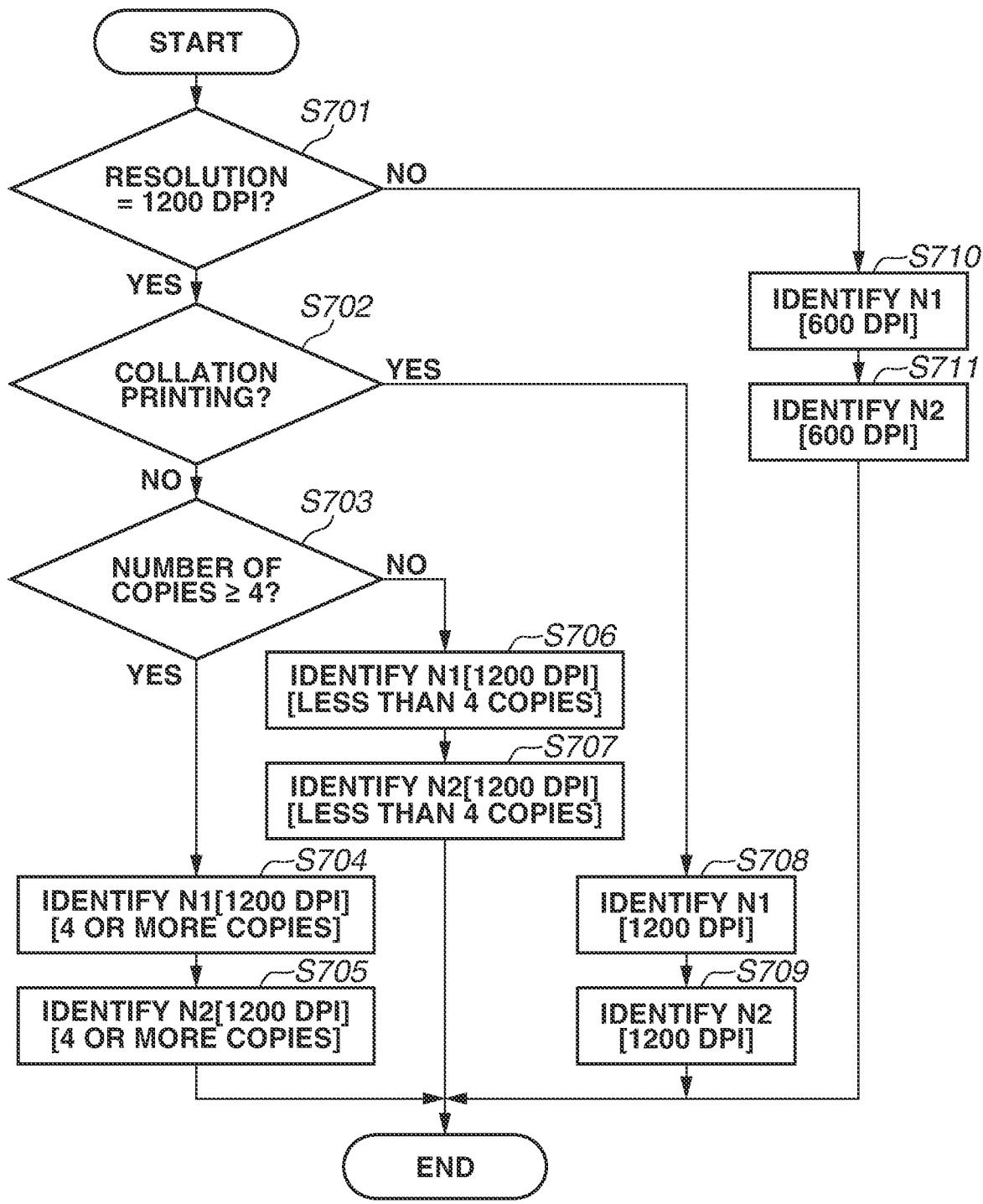
FIG. 7 is a flowchart illustrating processing for determining the number of sheets to be fed.

FIG. 7 is a flowchart illustrating processing for determining the number of sheets to be fed, N1, at the start of printing and the additional number of sheets to be fed, N2. The processing illustrated in this flowchart is implemented when the processing unit 131 reads and executes a program stored in the ROM of the storage unit 132. The processing illustrated in this flowchart corresponds to step S602 and is performed by referring to the print setting included in the print job received in step S601.

In step S701, the processing unit 131 determines whether the resolution of the image to be printed based on the print job is 1200 dpi. According to the present exemplary embodiment, the resolution of the image to be printed based on the print job is assumed to be 1200 or 600 dpi. The volume of image data representing an image with a 1200-dpi resolution is about 4 times the volume of image data representing an image with a 600-dpi resolution. This means that the time required to process image data representing an image with a 1200-dpi resolution is about 4 times the time required to process image data representing an image with a 600-dpi resolution. According to the present exemplary embodiment, at least the image processing on image data representing an image with a 1200-dpi resolution for one page needs to be completed while an image with a 1200-dpi resolution for one sheet is being printed. However, this processing cannot be achieved if an image with a 1200-dpi resolution for one sheet is printed with a throughput equivalent to that for printing of an image with a 600-dpi resolution. Therefore, according to the present exemplary embodiment, the throughput of printing of an image with a 1200-dpi resolution is controlled to be one fourth of the throughput of image printing of an image with a 600-dpi resolution. More specifically, for example, the speed (conveyance speed) at which paper is conveyed by the conveyance unit 1B in printing of an image with a 1200-dpi resolution is controlled to be one fourth of the conveyance speed in image printing representing an image with a 600-dpi resolution. For example, the time interval (feeding interval) at which paper is fed in printing of an image with a 1200-dpi resolution is controlled to be four times the feeding interval in image printing of an image with a 600-dpi resolution. More specifically, assume an example case where feeding of a plurality of sheets is instructed by a paper feed instruction. In image printing of an image with a 600-dpi resolution, paper is fed at intervals of 1 second. In image printing of an image with a 1200-dpi resolution, paper is fed at intervals of 4 seconds. The number of sheets to be fed by a paper feed instruction may be controlled according to the throughput. Therefore, according to the present exemplary embodiment, the processing unit 131 performs control such that the number of sheets to be fed by each paper feed instruction differs according to the resolution of the image to be printed based on the print job. When the processing unit 131 determines that the resolution is 1200 dpi (YES in step S701), the processing proceeds to step S702. On the other hand, when the processing unit 131 determines that the resolution is not 1200 dpi (NO in step S701), the processing proceeds to step S710.

In step S710, the processing unit 131 identifies the number of sheets to be fed, N1[600 dpi], at the start of printing when the resolution of the image to be printed based on the print job is 600 dpi. According to the present exemplary embodiment, N1[600 dpi]=8. However, N1[600 dpi] is not limited thereto and may be changed according to the maximum number of pages receivable by the image processing unit 134 and the speed at which paper is conveyable by the conveyance unit 1B. According to the present exemplary embodiment, printing is not started before the engine controller 13B receives print data for the number of sheets to be fed specified by a paper feed instruction. Therefore, the larger the value of N1[600 dpi], the longer the time delay until printing is started. In addition, the larger the value of N1[600 dpi], the larger the number of sheets to be wasted when printing is cancelled. On the other hand, the larger value of N1[600 dpi] makes it possible to continue continuous printing for a longer period of time even if image data reception is disabled by a trouble of the host device HC2 after printing is once started. The value of N1[600 dpi] may be arbitrarily determined in consideration of such characteristics. However, according to the present exemplary embodiment, the value of N1[600 dpi] is assumed to be less than the total number of sheets subjected to printing based on the print job and 2 or more.

In step S711, the processing unit 131 identifies the additional number of sheets to be fed, N2[600 dpi], when the resolution of the image to be printed based on the print job is 600 dpi. According to the present exemplary embodiment, N2[600 dpi]=N1[600 dpi]/2=4. However, N2[600 dpi] is not limited to N1/2 and may be arbitrarily determined. According to the present exemplary embodiment, the value of N2[600 dpi] is assumed to be less than the total number of sheets subjected to printing based on the print job and 2 or more. For example, N2[600 dpi] may be larger than N1[600 dpi]. As described above, when a paper feed instruction is once transmitted to the engine controller 13B, paper feeding based on the transmitted paper feed instruction is performed even if printing is canceled by the user. Therefore, the number of sheets to be fed by one paper feed instruction should be as small as possible. On the other hand, the number of sheets to be fed by one paper feed instruction is too small, a paper feed instruction needs to be transmitted at short time intervals. As a result, if the paper feed instruction belatedly reaches the engine controller 13B, printing is anticipated or highly likely to be interrupted. Taking these characteristics into consideration, it may be predetermined that N2[600 dpi] is 2 or more and less than N1[600 dpi]. Then, the processing exits this flowchart and proceeds to step S603.

When the resolution of the image to be printed based on the print job is 1200 dpi, the processing in step S702 is performed. In step S702, the processing unit 131 determines whether printing based on the print job is collation printing. Collation printing refers to a printing method for printing images one by one in order of the page number. On the other hand, non-collation printing (collective printing) refers to a printing method for successively printing an image on the same page for the specified number of copies and then successively printing an image on the next page for the specified number of copies in number-of-copies printing. For example, in collation printing of 3 pages in 2 copies, the first to third pages are sequentially printed and then the first to third pages are printed again. On the other hand, in collective printing of 3 pages in 2 copies, the first page is successively printed on 2 sheets, the second page is successively printed on 2 sheets, and the third page is successively printed on 2 sheets. When the processing unit 131 determines that printing based on the print job is collation printing (YES in step S702), the processing proceeds to step S708. On the other hand, when the processing unit 131 determines that printing based on the print job is not collation printing (NO in step S702), the processing proceeds to step S703. When printing based on the print job is not number-of-copies printing (including printing in one copy), images are printed one by one in order of the page number (YES in step S702).

In step S708, the processing unit 131 identifies the number of sheets to be fed, N1[1200 dpi], at the start of printing in collation printing when the resolution of the image to be printed based on the print job is 1200 dpi. In number-of-copies printing in less than 4 copies when the resolution of the image to be printed is 1200 dpi, a throughput equivalent to that for 600 dpi cannot be achieved (the throughput becomes one fourth). Therefore, according to the present exemplary embodiment, N1[1200 dpi]=N1[600 dpi]/4=2. N1[1200 dpi] is not limited to the above description and may be arbitrarily determined. According to the present exemplary embodiment, the value of N2[600 dpi] is assumed to be less than the total number of sheets subjected to printing based on the print job. Unlike the number of sheets to be fed, N1, when the resolution of the image to be printed based on the print job is 600 dpi, the number of sheets to be fed, N1, when the resolution of the image to be printed based on the print job is 1200 dpi may be 1. In printing of an image with a 1200-dpi resolution, the time required for printing on one sheet is sufficiently longer than the time required for printing an image with a 600-dpi resolution. Therefore, even if the next paper feed instruction belatedly reaches the engine controller 13B, the next paper feed instruction reaches the engine controller 13B before completion of printing on the paper fed by the previous paper feed instruction.

In step S709, the processing unit 131 identifies the additional number of sheets to be fed, N2[1200 dpi], in printing in only one copy when the resolution of the image to be printed based on the print job is 1200 dpi. According to the present exemplary embodiment, N2[1200 dpi]=N1[1200 dpi]/2=1. N2[1200 dpi] is not limited to the above description and may be arbitrarily determined. N2[1200 dpi] is assumed to be less than the total number of sheets subjected to printing based on the print job. For example, N2[1200 dpi] may be smaller than N1[1200 dpi]. Unlike the additional number of sheets to be fed, N2, when the resolution of the image to be printed based on the print job is 600 dpi, the additional number of sheets to be fed, N2, when the resolution of the image to be printed based on the print job is 1200 dpi may be 1. Taking the characteristics described in the description of step S711 into consideration, it may be predetermined that N2[1200 dpi] is less than N1[600 dpi]. Then, the processing exits this flowchart and proceeds to step S603.

When printing based on the print job is not collation printing (NO in step S702), the processing proceeds to step S703. In step S703, the processing unit 131 determines whether the number of copies subjected to printing is 4 or more. In collective printing in less than 4 copies, the image processing on image data for one page is not completed during printing of an image with a 1200-dpi resolution for one page with a throughput equivalent to that for printing of an image with a 600-dpi resolution. However, in collective printing in 4 or more copies, 4 or more images with a 1200-dpi resolution for one page are successively printed. Therefore, in collective printing in 4 or more copies, the image processing on image data for one page is completed during printing of an image with a 1200-dpi resolution for one page with a throughput equivalent to that for printing of an image with a 600-dpi resolution. As a result, when an image with a 1200-dpi resolution is printed in 4 or more copies, the image is can be printed with a throughput equivalent to that for the 600-dpi resolution. When the processing unit 131 determines that the number of copies is 4 or more (YES in step S703), the processing proceeds to step S704. On the other hand, the processing unit 131 determines that the number of copies is not 4 or more (NO in step S703), the processing proceeds to step S706. Also, in other than number-of-copies printing, i.e., in only one copy printing, the processing unit 131 determines that the number of copies is not 4 or more (NO in step S703).

In step S704, the processing unit 131 identifies the number of sheets to be fed, N1[1200 dpi][4 or more copies], in collective printing in 4 or more copies when the resolution of the image to be printed based on the print job is 1200 dpi. According to the present exemplary embodiment, N1[1200 dpi][4 or more copies]=N1[600 dpi]=8. The value of N1[1200 dpi][4 or more copies] may be arbitrarily determined. According to the present exemplary embodiment, the value of N1[1200 dpi][4 or more copies] is assumed to be less than the total number of sheets subjected to printing based on the print job and 2 or more. Then, the processing proceeds to step S705.

In step S705, the processing unit 131 identifies the additional number of sheets to be fed, N2[1200 dpi][4 or more copies], in collective printing in 4 or more copies when the resolution of the image to be printed based on the print job is 1200 dpi. According to the present exemplary embodiment, N2[1200 dpi][4 or more copies]=N1[1200 dpi][4 or more copies]/2=N2[600 dpi]=4. N2[1200 dpi][4 or more copies] not limited to N1/2 and may be arbitrarily determined. According to the present exemplary embodiment, the value of N2[1200 dpi][4 or more copies] is assumed to be less than the total number of sheets subjected to printing based on the print job. For example, N2[1200 dpi][4 or more copies] may be less than N1[1200 dpi][4 or more copies]. Taking the characteristics described in the description of S711 into consideration, it may be predetermined that N2[1200 dpi][4 or more copies] is less than N1[1200 dpi][4 or more copies]. Then, the processing exits this flowchart and proceeds to step S603.

In step S706, the processing unit 131 identifies the number of sheets to be fed, N1[1200 dpi][Less than 4 copies], in number-of-copies printing in less than 4 copies when the resolution of the image to be printed based on the print job is 1200 dpi. In number-of-copies printing in less than 4 copies when the resolution of the image to be printed is 1200 dpi, a throughput equivalent to that for 600 dpi cannot be achieved (the throughput becomes one fourth). According to the present exemplary embodiment, N1[1200 dpi][Less than 4 copies]=[600 dpi]/4=2. The value of N1[1200 dpi][Less than 4 copies] may be arbitrarily determined. According to the present exemplary embodiment, the values of N1[1200 dpi][Less than 4 copies] is assumed to be less than the total number of sheets subjected to printing based on the print job.

In step S707, the processing unit 131 identifies the additional number of sheets to be fed, N2[1200 dpi][Less than 4 copies], in number-of-copies printing in less than 4 copies when the resolution of the image to be printed based on the print job is 600 dpi. According to the present exemplary embodiment, N2[1200 dpi][Less than 4 copies]=N1[1200 dpi][Less than 4 copies]/2=N2[600 dpi]/4=1. N2[1200 dpi][Less than 4 copies] is not limited thereto and may be arbitrarily determined. N2[1200 dpi][Less than 4 copies] is assumed to be less than the total number of sheets subjected to printing based on the print job. For example, N2[1200 dpi][Less than 4 copies] may be less than N1[1200 dpi][Less than 4 copies]. Taking the characteristics described in the description of S711 into consideration, it may be predetermined that N2[1200 dpi][Less than 4 copies] is less than N1[1200 dpi][Less than 4 copies]. Then, the processing exits this flowchart and proceeds to step S603.

Figure 8:
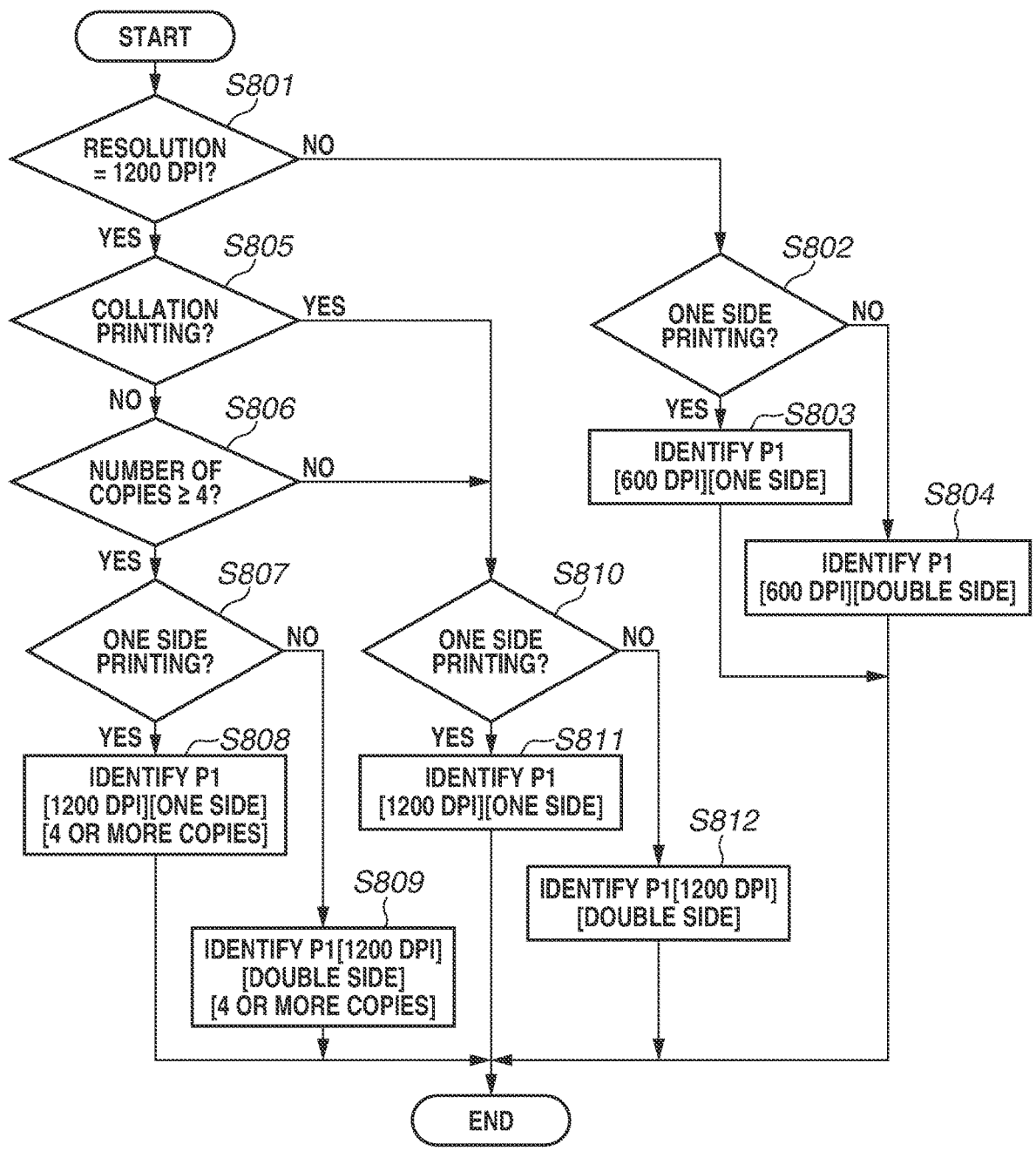
FIG. 8 is a flowchart illustrating processing for determining a paper feed timing.

FIG. 8 is a flowchart for determining the timing for issuing a paper feed instruction for feeding N1 sheets. The processing illustrated in this flowchart is implemented when the processing unit 131 reads and executes a program stored in the ROM of the storage unit 132. The processing illustrated in this flowchart corresponds to step S603 and is implemented by referring to the print setting included in the print job received in step S601. More specifically, the processing unit 131 identifies the number of pieces of the image data, P1, by the processing illustrated in this flowchart. Then, the timing when image data for P1 sheets is received is the timing when issuing a paper feed instruction for feeding N1 sheets.

In step S801, the processing unit 131 determines whether the resolution of the image to be printed based on the print job is 1200 dpi. When the processing unit 131 determines that the resolution of the image to be printed is 1200 dpi (YES in step S801), the processing proceeds to step S805. On the other hand, when the processing unit 131 determines that the resolution of the image to be printed is not 1200 dpi (NO in step S801), the processing proceeds to step S802.

In step S802, the processing unit 131 determines whether printing based on the print job is one-side printing (whether printing is double-side printing). When the processing unit 131 determines that printing based on the print job is one-side printing (YES in step S802), the processing proceeds to step S803. On the other hand, when the processing unit 131 determines that printing based on the print job is not one-side printing (NO in step S802), the processing proceeds to step S804.

In step S803, the processing unit 131 identifies the number of pieces of the image data to be received, P1[600 dpi][One side], before the start of printing in one-side printing when the resolution of the image to be printed based on the print job is 600 dpi. According to the present exemplary embodiment, P1[600 dpi][One side]=12. However, P1[600 dpi][One side] is not limited thereto and may be an arbitrary value. When a paper feed instruction is once transmitted to the engine controller 13B, paper feeding based on the transmitted paper feed instruction is performed even if printing is canceled by the user. Therefore, the timing for transmitting a paper feed instruction may be as late as possible. On the other hand, if the timing for transmitting a paper feed instruction is too late, the timing when printing is started will become too late. Taking these characteristics into consideration, it may be predetermined that the value of P1[600 dpi][One side] is N1[600 dpi] or more and N1[600 dpi]+N2[600 dpi] or less. Then, the processing unit 131 ends the processing of this flowchart, and the processing proceeds to step S604.

In step S804, the processing unit 131 identifies the number of pieces of the image data to be received, P1[600 dpi][Double side], before the start of printing in double-side printing when the resolution of the image to be printed based on the print job is 600 dpi. In double-side printing, printing needs to be started after completion of reception of both the image data to be printed on the front surface and the image data to be printed on the back surface. The reason for this processing is as follows. After printing is started in a state where only the image data to be printed on the front surface is received, if the image data to be printed on the back surface cannot be received because of a certain error, the back surface is not printed and a suitable printed matter is not obtained. Therefore, according to the present exemplary embodiment, P1[600 dpi][Double side]=P1[600 dpi][One side]*2=24. It may be predetermined that the value of P1[600 dpi][Double side] is N1[600 dpi]*2 or more and (N1[600 dpi]+N2[600 dpi])*2 or less. Then, the processing unit 131 ends the processing of this flowchart, and the processing proceeds to step S604.

When the resolution of the image to be printed based on the print job is 1200 dpi, the processing in step S805 is performed. In step S805, the processing unit 131 determines whether printing based on the print job is collation printing. When the processing unit 131 determines that printing based on the print job is not collation printing (NO in step S805), the processing proceeds to step S806. On the other hand, when the processing unit 131 determines that printing based on the print job is collation printing (YES in step S805), the processing proceeds to step S810. Also, if printing based on the print job is only one copy printing, the processing unit 131 determines that printing based on the print job is collation printing (YES in step S805).

In step S806, the processing unit 131 determines whether the number of copies specified in number-of-copies printing is 4 or more. When the processing unit 131 determines that the number of copies is 4 or more (YES in step S806), the processing proceeds to step S807. On the other hand, when the processing unit 131 determines that the number of copies is not 4 or more (NO in step S806), the processing proceeds to step S810.

In step S807, the processing unit 131 determines whether printing based on the print job is one-side printing (whether printing is double-side printing). When the processing unit 131 determines that printing based on the print job is one-side printing (YES in step S807), the processing proceeds to step S808. On the other hand, when the processing unit 131 determines that printing based on the print job is not one-side printing (NO in step S807), the processing proceeds to step S809.

In step S808, the processing unit 131 identifies the number of pieces of the image data to be received, P1[1200 dpi][One side][4 or more copies], before the start of printing in one-side printing in 4 or more copies when the resolution of the image to be printed based on the print job is 1200 dpi. According to the present exemplary embodiment, P1[1200 dpi][One side][4 or more copies]=P1[600 dpi][One side]=12. It may be predetermined that the value of P1[1200 dpi][One side][4 or more copies] is N1[1200 dpi][4 or more copies] or more and N1[1200 dpi][4 or more copies]+N2[1200 dpi][4 or more copies] or less. Then, the processing unit 131 ends the processing of this flowchart, and the processing proceeds to step S604.

In step S809, the processing unit 131 identifies the number of pieces of the image data to be received, P1[1200 dpi][Double side][4 or more copies], before the start of printing in double-side printing in 4 or more copies when the resolution of the image to be printed based on the print job is 1200 dpi. According to the present exemplary embodiment, P1[1200 dpi][One side][4 or more copies]=P1[600 dpi][Double side]=24. It may be predetermined that the value of P1[1200 dpi][Double side][4 or more copies] is N1[1200 dpi][4 or more copies]*2 or more and (N1[1200 dpi][4 or more copies]+N2[1200 dpi][4 or more copies])*2 or less. Then, the processing unit 131 ends the processing of this flowchart, and the processing proceeds to step S604.

When printing based on the print job is not number-of-copies printing or when printing based on the print job is number-of-copies printing in less than 4 copies, the processing in step S810 is performed. In step S810, the processing unit 131 determines whether printing based on the print job is one-side printing (whether printing is double-side printing). When the processing unit 131 determines that printing based on the print job is one-side printing (YES in step S810), the processing proceeds to step S811. On the other hand, when the processing unit 131 determines that printing based on the print job is not one-side printing (NO in step S810), the processing proceeds to step S812.

In step S811, the processing unit 131 identifies the number of pieces of the image data to be received, P1[1200 dpi][One side][One copy], before the start of printing in one-side printing in only one copy when the resolution of the image to be printed based on the print job is 1200 dpi. The processing unit 131 identifies the number of pieces of the image data to be received, P1[1200 dpi][One side][Less than 4 copies], before the start of printing in one-side printing in less than 4 copies when the resolution of the image to be printed based on the print job is 1200 dpi. According to the present exemplary embodiment, P1[1200 dpi][One side][One copy]=P1[1200 dpi][One side][Less than 4 copies]=P1[600 dpi][One side]/4=3. It may be predetermined that the value identified in step S811 is N1[1200 dpi][Less than 4 copies] or more and N1[1200 dpi][Less than 4 copies]+N2[1200 dpi][Less than 4 copies] less. Then, the processing unit 131 ends the processing of this flowchart, and the processing proceeds to step S604.

In step S812, the processing unit 131 identifies the number of pieces of the image data to be received, P1[1200 dpi][Double side][One copy], before the start of printing in double-side printing in only one copy when the resolution of the image to be printed based on the print job is 1200 dpi. Alternatively, the processing unit 131 identifies the number of pieces of the image data to be received, P1[1200 dpi][Double side][Less than 4 copies], before the start of printing in one-side printing in less than 4 copies when the resolution of the image to be printed based on the print job is 1200 dpi. According to the present exemplary embodiment, P1[1200 dpi][Double side][One copy]=P1[1200 dpi][Double side][Less than 4 copies]=P1[600 dpi][Double side][One copy]/4=6. It may be predetermined that the value identified in step S812 is N1[1200 dpi][Less than 4 copies]*2 or more and (N1[1200 dpi][Less than 4 copies]+N2[1200 dpi][Less than 4 copies])*2 or less. Then, the processing unit 131 ends the processing of this flowchart, and the processing proceeds to step S604.

FIG. 9 is a flowchart for determining the timing for issuing a paper feed instruction for feeding N2 sheets. The processing illustrated in this flowchart is implemented when the processing unit 131 reads and executes a program stored in the ROM of the storage unit 132. The processing illustrated in this flowchart corresponds to step S605 and is performed by referring to the print setting included in the print job received in step S601. More specifically, the processing unit 131 identifies the number of pieces of the image data, P2, by the processing illustrated in this flowchart. Then, the timing when image data for P2 sheets is received from the last paper feed instruction and the image processing on image data for P2 sheets is completed since the last paper feed instruction was transmitted is the timing for issuing a paper feed instruction for feeding N2 sheets. After reception of all of the image data based on the print job, the timing when the image processing on image data for P2 sheets is completed since the last paper feed instruction was transmitted is the timing for issuing a paper feed instruction for feeding N2 sheets.

In step S901, the processing unit 131 determines whether the resolution of the image to be printed based on the print job is 1200 dpi. When the processing unit 131 determines that the resolution is 1200 dpi (YES in step S901), the processing proceeds to step S905. On the other hand, when the processing unit 131 determines that the resolution is not 1200 dpi (NO in step S901), the processing proceeds to step S902.

In step S902, the processing unit 131 determines whether printing based on the print job is one-side printing (whether printing is double-side printing). When the processing unit 131 determines that printing based on the print job is one-side printing (YES in step S902), the processing proceeds to step S903. On the other hand, when the processing unit 131 determines that printing based on the print job is not one-side printing (NO in step S902), the processing proceeds to step S904.

In step S903, the processing unit 131 identifies a constant P2[600 dpi][One side] in one-side printing when the resolution of the image to be printed based on the print job is 600 dpi. According to the present exemplary embodiment, P2[600 dpi][One side]=4. However, P2[600 dpi][One side] is not limited thereto and may be arbitrarily determined. According to the present exemplary embodiment, the value of P2[600 dpi][One side] is assumed to be 2 or more. The reason for this value setting is as follows. When the value of P2[600 dpi][One side] is 1 or less, if a paper feed instruction belatedly reaches the engine controller 13B because of a certain cause, paper feeding by the last paper feed instruction is completed and printing is interrupted. As described above, when a paper feed instruction is once transmitted to the engine controller 13B, paper feeding based on the paper feed instruction transmitted is performed even if printing is canceled by the user. Therefore, the tuning for transmitting a paper feed instruction may be as late as possible. On the other hand, if the timing for transmitting a paper feed instruction is too late, paper feeding by the last paper feed instruction is completed before the paper feed instruction reaches the engine controller 13B and printing is interrupted. Taking these characteristics into consideration, it may be predetermined that the value of P2[600 dpi][One side] is 2 or more and N2[600 dpi] or less. Then, the processing unit 131 ends the processing of this flowchart, and the processing proceeds to step S606.

In step S904, the processing unit 131 identifies a constant P2[600 dpi][Double side] in double-side printing when the resolution of the image to be printed based on the print job is 600 dpi. According to the present exemplary embodiment, P2[600 dpi][Double side]=P2[600 dpi][One side]*2=24. It may be predetermined that the value of P2[600 dpi][Double side] is 2 or more and N2[600 dpi]*2 or less. Then, the processing unit 131 ends the processing of this flowchart, and the processing proceeds to step S606.

When the resolution of the image to be printed based on the print job is 1200 dpi, the processing in step S905 is performed. In step S905, the processing unit 131 determines whether printing based on the print job is number-of-copies printing. When the processing unit 131 determines that printing based on the print job is number-of-copies printing (YES in step S905), the processing proceeds to step S910. On the other hand, when the processing unit 131 determines that printing based on the print job is not number-of-copies printing (NO in step S905), the processing proceeds to step S906.

In step S906, the processing unit 131 determines whether the number of copies specified in number-of-copies printing is 4 or more. When the processing unit 131 determines that the number of copies is 4 or more (YES in step S906), the processing proceeds to step S907. On the other hand, when the processing unit 131 determines that the number of copies is not 4 or more (NO in step S906), the processing proceeds to step S910.

In step S907, the processing unit 131 determines whether printing based on the print job is one-side printing (whether printing is double-side printing). When the processing unit 131 determines that printing based on the print job is one-side printing (YES in step S907), the processing proceeds to step S908. On the other hand, when the processing unit 131 determines that printing based on the print job is not one-side printing (NO in step S907), the processing proceeds to step S909.

In step S908, the processing unit 131 identifies a constant P2[1200 dpi][One side][4 or more copies] in one-side printing in 4 or more copies when the resolution of the image to be printed based on the print job is 1200 dpi. According to the present exemplary embodiment, P2[1200 dpi][One side][4 or more copies]=P2[600 dpi][One side]=4. It may be predetermined that the value of P2[1200 dpi][One side][4 or more copies] is N2[600 dpi] or less. Then, the processing unit 131 ends the processing of this flowchart, and the processing proceeds to step S606.

In step S909, the processing unit 131 identifies a constant P2[1200 dpi][Double side][4 or more copies] in double-side printing in 4 or more copies when the resolution of the image to be printed based on the print job is 1200 dpi. According to the present exemplary embodiment, P2[1200 dpi][Double side][4 or more copies]=P2[600 dpi][Double side]=8. It may be predetermined that the value of P2[1200 dpi][Double side][4 or more copies] is N2[600 dpi]*2 or less. Then, the processing unit 131 ends the processing of this flowchart, and the processing proceeds to step S606.

When printing based on the print job is not number-of-copies printing or when printing based on the print job is number-of-copies printing in less than 4 copies, the processing in step S910 is performed. In step S910, the processing unit 131 determines whether printing based on the print job is one-side printing (whether printing is double-side printing). When the processing unit 131 determines that printing based on the print job is one-side printing (YES in step S910), the processing proceeds to step S911. On the other hand, when the processing unit 131 determines that printing based on the print job is not one-side printing (NO in step S910), the processing proceeds to step S912.

In step S911, the processing unit 131 identifies a constant P2[1200 dpi][One side][One copy] in one-side printing in only one copy when the resolution of the image to be printed based on the print job is 1200 dpi. The processing unit 131 identifies a constant P2[1200 dpi][One side][Less than 4 copies] in one-side printing in less than 4 copies when the resolution of the image to be printed based on the print job is 1200 dpi. According to the present exemplary embodiment, P2[1200 dpi][One side]=P2[1200 dpi][One side][Less than 4 copies]=P2[600 dpi][One side]/4=1. It may be predetermined that the value acquired in this case is N2[1200 dpi][Less than 4 copies] or less. Unlike P2 when the resolution of the image to be printed based on the print job is 600 dpi, P2 when the resolution of the image to be printed based on the print job is 1200 dpi may be 1. Then, the processing unit 131 ends the processing of this flowchart, and the processing proceeds to step S606.

In step S912, the processing unit 131 identifies a constant P2[1200 dpi][Double side][One copy] in double-side printing in only one copy when the resolution of the image to be printed based on the print job is 1200 dpi. Alternatively, the processing unit 131 identifies a constant P2[1200 dpi][Double side][Less than 4 copies] in one-side printing in less than 4 copies when the resolution of the image to be printed based on the print job is 1200 dpi. According to the present exemplary embodiment, P2[1200 dpi][Double side][One copy]=P2[1200 dpi][Double side][Less than 4 copies]=P2[600 dpi][Double side][One copy]/4=2. It may be predetermined that the value acquired in this case is N2[1200 dpi][Less than 4 copies]*2 or less. Then, the processing unit 131 ends the processing of this flowchart, and the processing proceeds to step S606.

In the processing illustrated in FIGS. 7 to 9, the processing unit 131 may calculate the values of N1, N2, P1, and P2 by using the above-described formulas or acquire these values from tables stored in the storage unit 132. Examples of tables stored in the storage unit 132 are illustrated in FIGS. 10A and 10B. FIG. 10A is a table illustrating the values of N1, N2, P1, and P2 when printing based on a print job is one-side printing and the resolution of the image to be printed based on the print job is 600 dpi. FIG. 10B is a table illustrating the values of N1, N2, P1, and P2 when printing based on a print job is double-side printing and the resolution of the image to be printed based on the print job is 600 dpi. In addition to the tables illustrated in FIGS. 10A and 10B, a table to be referred to when the resolution of the image to be printed based on the print job is 1200 dpi may be stored in the storage unit 132.

Although, in the above descriptions, P1 is identified in step S603 and P2 is identified in step S606, both P1 and P2 may be identified, for example, in step S603.

By determining the timing for issuing a paper feed instruction and the number of sheets to be fed as described above, the processing unit 131 according to the present exemplary embodiment can perform control to suitably perform paper feeding. More specifically, the processing unit 131 can prevent printing based on a print job from being interrupted and restrain the number of sheets to be wasted when printing based on the print job is canceled.

An example of a flow of processing determined by the above-described control will be illustrated.

FIG. 12 illustrates a flow of print processing based on a print job for performing one-side and collective printing of 1200-dpi images for 4 pages in 4 copies.

In collective printing, since the same image is successively printed for the number of copies (4 copies in this case), image data for one page only needs to be received to feed 4 sheets. However, according to the present exemplary embodiment, reception processing needs to be performed for the number of sheets subjected to printing because of mechanical restrictions. The reception processing refers to processing for requesting image data from the host device HC2. Therefore, the processing unit 131 performs the reception processing once to receive image data for one page and, in step 601, repetitively performs the reception processing three times. In the reception processing performed in step 601, the processing unit 131 only requests image data from the host device HC2 but does not receive image data. This also applies to the image processing and the transfer processing. More specifically, the processing unit 131 performs the actual image processing and transfer processing for one page and then repetitively performs processing for requesting the processing three times.

In a case illustrated in FIG. 12, when image data for three sheets is received, a first paper feed instruction 1203 is transmitted. The image data received at this timing is image data representing a 1200-dpi image. Therefore, in this case, the time required to receive image data for three sheets is about four times the time required to receive image data representing a 600-dpi image. Likewise, the time required to perform the image processing and transfer processing is about four times the time required to perform similar processing on image data and print data representing a 600-dpi image. The paper feed instruction 1203 instructs to feed 8 sheets.

When image data for one page is received and the image processing on image data for one page is completed since the last paper feed instruction was transmitted, an additional paper feed instruction 1204 is transmitted. The paper feed instruction 1204 instructs to feed 4 sheets.

If the engine controller 13B has received the paper feed instruction, and the reception of print data for the number of sheets to be fed based on the paper feed instruction is completed, the engine controller 13B starts paper feeding. In this case, because of number-of-copies printing in 4 or more copies, the 1200-dpi image is printed at a speed equivalent to that of the throughput for printing of a 600-dpi image.

Figure 13:
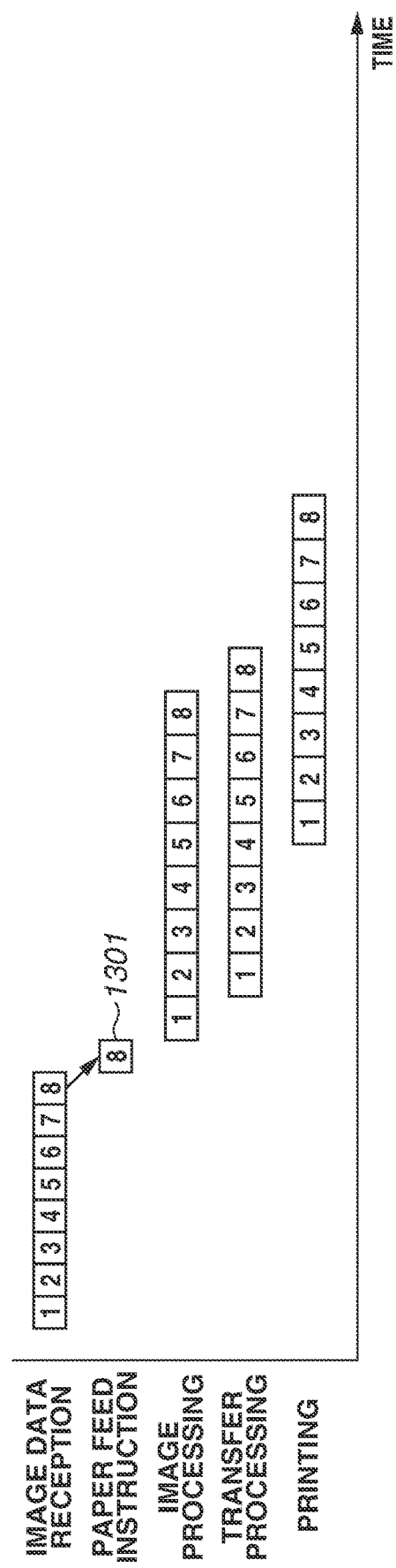
FIG. 13 illustrates a flow of print processing based on a print job for performing one-side printing of 600-dpi images for 8 pages in one copy.

FIG. 13 illustrates a flow of print processing based on a print job for performing one-side printing of 600-dpi images for 8 pages in one copy.

According to the present exemplary embodiment, P1[600 dpi][One side]=12. However, there may arise a case where the number of pages of the image to be printed by the print job is P1[600 dpi][One side] or less, as in the case illustrated in FIG. 13. In this case, a paper feed instruction 1301 is transmitted on the premise that P1 is the total number of pieces of image data based on the print job. N1 is assumed to be the same as the total number of sheets subjected to printing based on the print job. Therefore, the paper feed instruction 1301 instructs to feed the same number of sheets as the total number of sheets subjected to printing based on the print job.

In this way, when the number of sheets subjected to printing by the print job is small or when the number of pieces of image data based on the print job is small, the values of P1 and N1 may differ from the values illustrated in FIGS. 7 to 9.

Other Exemplary Embodiments

The above-described exemplary embodiments are based on an example of an image forming apparatus for transferring an image formed on the transfer member 2 by the full line type recording heads for discharging ink, onto a recording medium fed from the feeding unit 7. However, the present disclosure is not limited to an image forming apparatus employing such an image forming process. For example, the present disclosure is also applicable to an image forming apparatus for forming an image by directly discharging ink to a recording medium, and an image forming apparatus employing an electrophotographic process. The present disclosure is applicable to an image forming apparatus including a feeding unit that executes successively feeding recording media.

Although, in the above-described example cases, a 600-dpi image and a 1200-dpi image are printed, the present disclosure is not limited thereto. An image with any resolution may be printed. The throughput of an image with each resolution differs according to the resolution. In a case of a low resolution and a high image processing speed and a high throughput, control is performed such that N2 becomes 2 or more. However, in a case of a sufficiently high resolution and a sufficiently low image processing speed and throughput, control may be performed such that N2 becomes 1. In steps S703, S806, and S906, the processing unit 131 determines whether the number of copies in collective printing is 4 or more. The values identified in collective printing in 4 or more copies are identical between a case where a 600-dpi image is printed and a case where a 1200-dpi image is printed. However, when the resolution of the image to be printed is neither 600 nor 1200 dpi, the present disclosure is not limited to this form. For example, the resolutions of images printable by the image forming apparatus 1 are assumed to be A and B (A=N*B). In this case, in steps S703, S806, and S906, the processing unit 131 determines whether printing is collective printing in the square of N or more copies. The values identified in collective printing in the square of N or more copies are identical between a case where an A-dpi image is printed and a case where a B-dpi image is printed. The values identified in collective printing in copies less than the square of N will be different between a case where an A-dpi image is printed and a case where a B-dpi image is printed.

Although, in the above descriptions, cut paper is fed to the conveyance unit 1B, the present disclosure is not limited to this form. Rolled paper set in the image forming apparatus 1 may be cut at arbitrary timing, and cut paper may be fed to the conveyance unit 1B.

The present disclosure can also be achieved when a program for implementing at least one of the functions according to the above-described exemplary embodiments is supplied to a system or apparatus via a network or storage medium, and at least one processor in a computer of the system or apparatus reads and executes the program. Further, the present disclosure can also be achieved by a circuit (for example, an application specific integrated circuit (ASIC)) for implementing at least one function.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-148580, filed Aug. 7, 2018, which is hereby incorporated by reference herein in its entirety.

What is claimed is:

1. A feed instruction apparatus comprising:
at least one processor configured to control:
a reception unit configured to receive one print job for printing an image on a plurality of recording media; and
a transmission unit configured to transmit, upon reception of the one print job, a first plurality of feed instructions for feeding two or more recording media of a number smaller than a total number of recording media subjected to printing based on the one received print job,
wherein, in a case where the one received print job is a first print job for printing an image having a first value resolution, first processing is performed to transmit the first plurality of feed instructions for feeding the two or more recording media,
wherein, in a case where the one received print job is a second print job for printing an image having a second value resolution higher than the first value resolution, second processing is performed to transmit a second plurality of feed instructions for feeding one or more recording media of the number smaller than the total number of recording media subjected to printing based on the one received print job,
wherein a number of first recording media of the one or more recording media to be fed based on one feed instruction included in the first plurality of feed instructions to be transmitted in the first processing is larger than a number of second recording media of the one or more recording media to be fed based on one feed instruction included in the second plurality of feed instructions to be transmitted in the second processing,
wherein, each time a feed instruction of the first or second plurality of feed instructions is received by a feeding unit, recording medium of a number based on the feed instruction received by the feeding unit are fed one by one to a conveyance unit by the feeding unit,
wherein, in processing the one received print job, an image based on the one received print job is printed on a recording media of the plurality of recording media by a printing unit, and
wherein the printed recording media is configured to be conveyed via the conveyance unit based on the first or second plurality of feed instructions.

2. The feed instruction apparatus according to claim 1, wherein a number of second recording media to be fed based on a second and subsequent feed instructions transmitted out of the second plurality of feed instructions is smaller than a number of first recording media to be fed based on a first feed instruction transmitted out of the first plurality of feed instructions.

3. The feed instruction apparatus according to claim 1, wherein the at least one processor further controls a data reception unit configured to sequentially receive a plurality of image data based on the one received print job, and
wherein a first feed instruction to be transmitted out of the first plurality of feed instructions is transmitted upon reception of a predetermined number of pieces of image data out of the plurality of image data.

4. The feed instruction apparatus according to claim 3, wherein the predetermined number of pieces of image data is two or more.

5. The feed instruction apparatus according to claim 1, wherein the at least one processor further controls a data reception unit configured to sequentially receive a plurality of image data based on the one received print job, and
wherein a second and subsequent feed instructions to be transmitted out of the second plurality of feed instructions are transmitted upon reception of a specific number of pieces of image data out of the plurality of image data since a last feed instruction was transmitted.

6. The feed instruction apparatus according to claim 5, wherein the specific number of pieces of image data is two or more.

7. The feed instruction apparatus according to claim 1, wherein a second feeding interval of recording media of the one or more recording media in printing of the image having the second value resolution is longer than a first feeding interval of recording media of the one or more recording media in printing of the image having the first value resolution.

8. The feed instruction apparatus according to claim 1,
wherein the second value resolution is n times the first value resolution,
wherein, in a case where the one received print job is a print job (i) for printing a plurality of images having the second value resolution in a square of n or more copies, and (ii) for performing processing for (a) printing, in one copy, a first image included in the plurality of images and (b) subsequently performing processing for printing, in one copy, a second image included in the plurality of images, the number of second recording media to be fed based on one feed instruction included in the second plurality of feed instructions transmitted in the second processing is the same as the number of first recording media to be fed based on one feed instruction included in the first plurality of feed instructions transmitted in the first processing, and
wherein, in a case where the one received print job is a print job (i) for printing the plurality of images having the second value resolution in a square of n or more copies and (ii) for successively printing the first image in a number of first copies and then successively printing the second image in a number of second copies, the number of second recording media is smaller than the number of first recording media.

9. The feed instruction apparatus according to claim 8, wherein, in a case where the one received print job is a print job for printing the plurality of images having the second value resolution in less than a square of n copies, the number of second recording media is smaller than the number of first recording media.

10. The feed instruction apparatus according to claim 1, wherein the first value resolution is a 600-dots per inch (dpi) resolution, and the second value resolution is a 1200-dpi resolution.

11. The feed instruction apparatus according to claim 1, wherein all of images based on the one received print job are printed based on identical print setting based on the one received print job.

12. The feed instruction apparatus according to claim 1, wherein, even after a first paper feed instruction and a second paper feed instruction are transmitted in this order to the feeding unit, if the second paper feed instruction does not reach the feeding unit before completion of paper feeding instructed by the first paper feed instruction, printing based on the second paper feed instruction is not performed but maintenance processing for the printing unit is performed.

13. The feed instruction apparatus according to claim 1, wherein the at least one processor further controls a supply unit configured to supply the recording medium to the conveyance unit via the feeding unit.

14. The feed instruction apparatus according to claim 1, wherein, based on the one received print job via the printing unit, the printing unit is configured to print an image on the recording medium conveyed via the conveyance unit.

15. The feed instruction apparatus according to claim 1, wherein the printing unit is configured to form an image with ink on the recording medium.

16. The feed instruction apparatus according to claim 1, wherein the printing unit is configured to form an image by transferring an ink image formed on a transfer member to the recording medium.

17. A method for controlling a feed instruction apparatus, the method comprising:
at least one processor configured to control:
receiving one print job for printing an image on a plurality of recording media; and
transmitting, upon reception of the one print job, a first plurality of feed instructions for feeding two or more recording media of a number smaller than a total number of recording media subjected to printing based on the one received print job,
wherein, in a case where the one received print job is a first print job for printing an image having a first value resolution, first processing is performed to transmit the first plurality of feed instructions for feeding the two or more recording media,
wherein, in a case where the one received print job is a second print job for printing an image having a second value resolution higher than the first value resolution, second processing is performed to transmit a second plurality of feed instructions for feeding one or more recording media of the number smaller than the total number of recording media subjected to printing based on the one received print job,
wherein a number of first recording media of the one or more recording media to be fed based on one feed instruction included in the first plurality of feed instructions to be transmitted in the first processing is larger than a number of second recording media of the one or more recording media to be fed based on one feed instruction included in the second plurality of feed instructions to be transmitted in the second processing,
wherein, each time a feed instruction of the first or second plurality of feed instructions is received, recording medium of a number based on the received feed instruction are fed one by one to a conveyance unit,
wherein, in processing the one received print job, an image based on the one received print job is printed on a recording media of the plurality of recording media by a printing unit, and
wherein the printed recording media is configured to be conveyed via the conveyance unit based on the first or second plurality of feed instructions.

18. A non-transitory computer-readable storage medium storing a program to cause a computer to perform a method for controlling a feed instruction apparatus, the method comprising:
at least one processor configured to control:
receiving one print job for printing an image on a plurality of recording media; and
transmitting, upon reception of the one print job, a first plurality of feed instructions for feeding two or more recording media of a number smaller than a total number of recording media subjected to printing based on the one received print job,
wherein, in a case where the one received print job is a first print job for printing an image having a first value resolution, first processing is performed to transmit the first plurality of feed instructions for feeding the two or more recording media, wherein, in a case where the one received print job is a second print job for printing an image having a second value resolution higher than the first value resolution, second processing is performed to transmit a second plurality of feed instructions for feeding one or more recording media of the number smaller than the total number of recording media subjected to printing based on the one received print job, wherein a number of first recording media of the one or more recording media to be fed based on one feed instruction included in the first plurality of feed instructions to be transmitted in the first processing is larger than a number of second recording media of the one or more recording media to be fed based on one feed instruction included in the second plurality of feed instructions to be transmitted in the second processing, wherein, each time a feed instruction of the first or second plurality of feed instructions is received, recording medium of a number based on the received feed instruction are fed one by one to a conveyance unit, wherein, in processing the one received print job, an image based on the one received print job is printed on a recording media of the plurality of recording media by a printing unit, and wherein the printed recording media is configured to be conveyed via the conveyance unit based on the first or second plurality of feed instructions.

* * * * *